A. ALTMAN.
NEEDLE STRAIGHTENING MACHINE.
APPLICATION FILED FEB. 14, 1918.
1,361,515.
Patented Dec. 7, 1920.
16 SHEETS—SHEET 1.
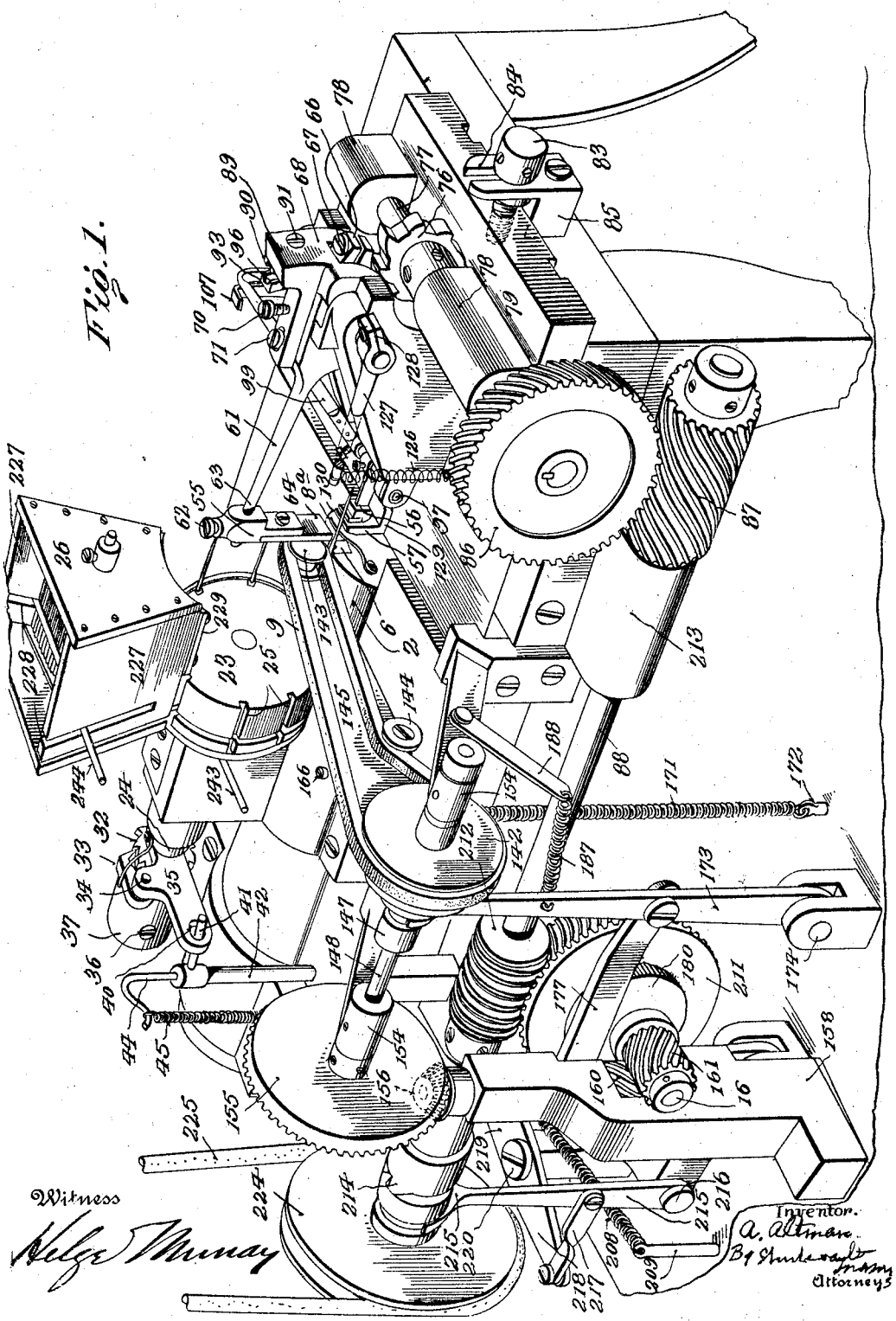

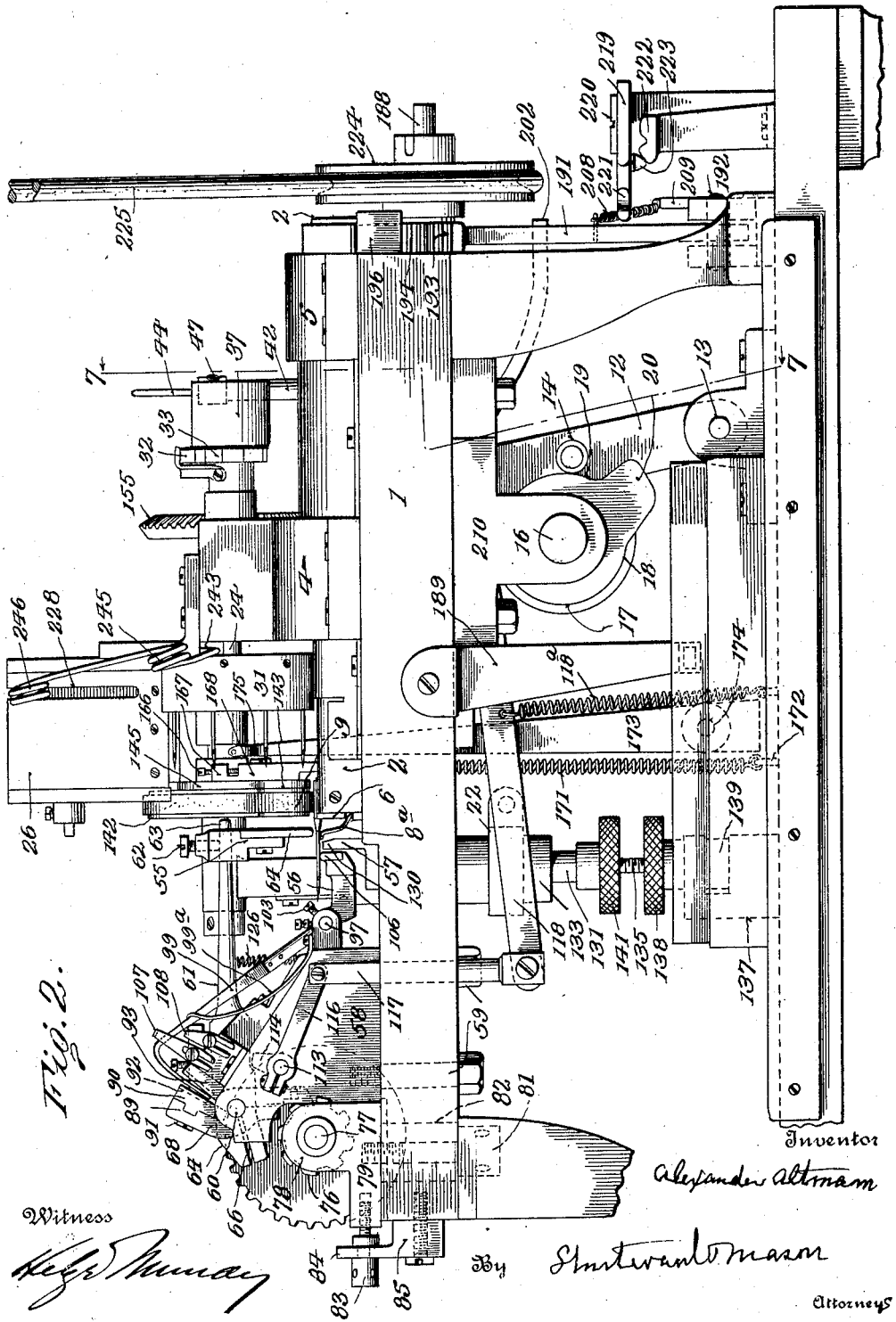

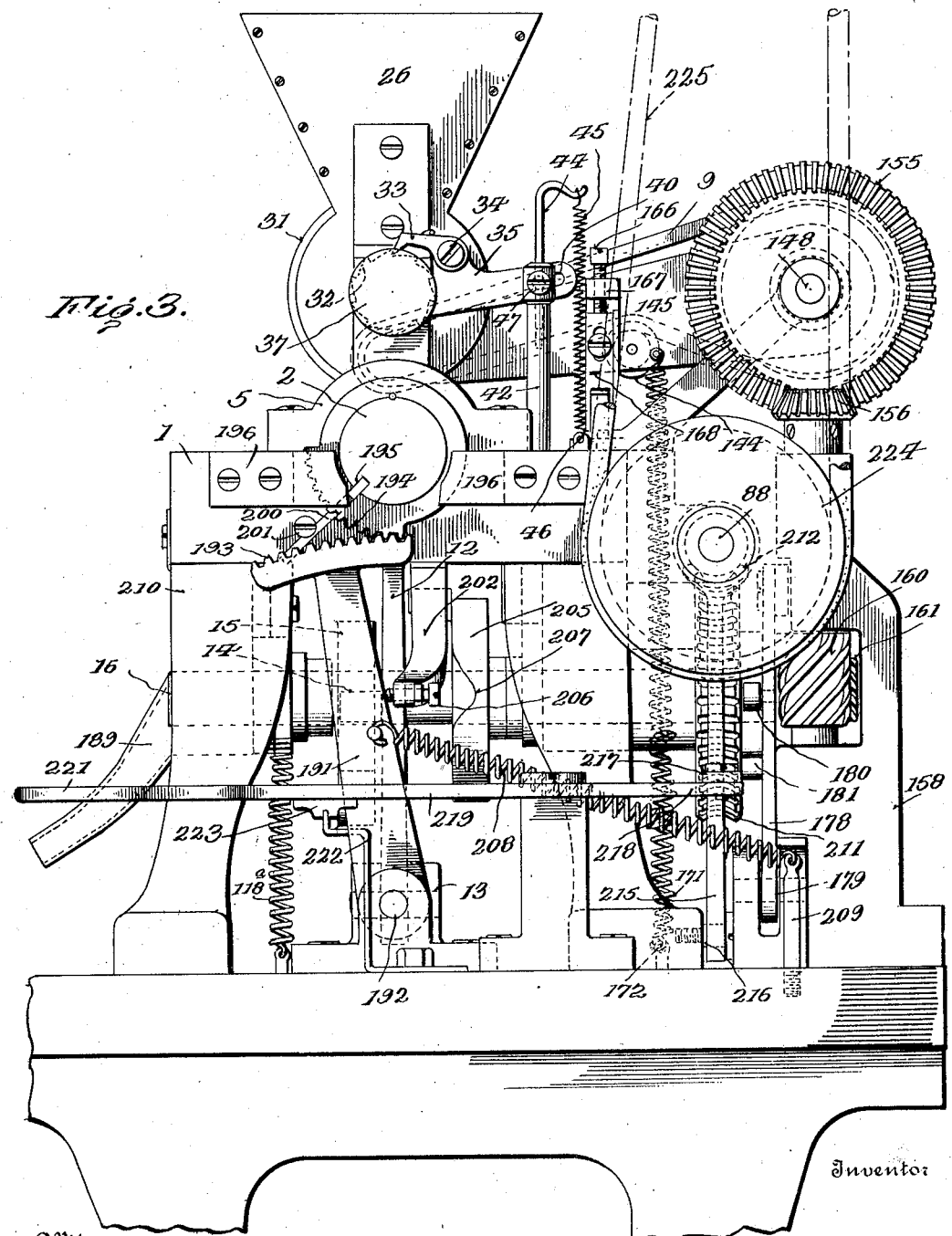

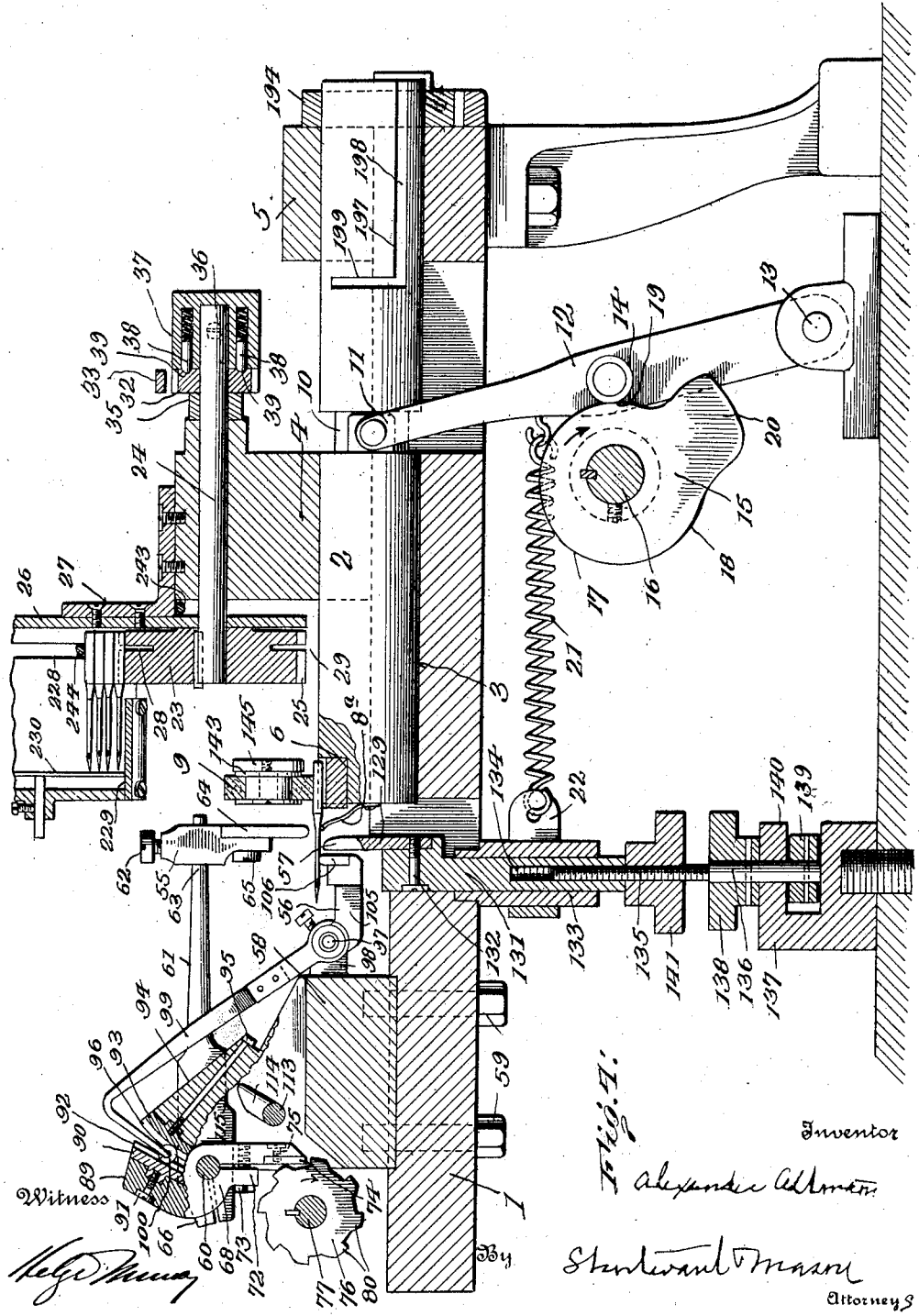

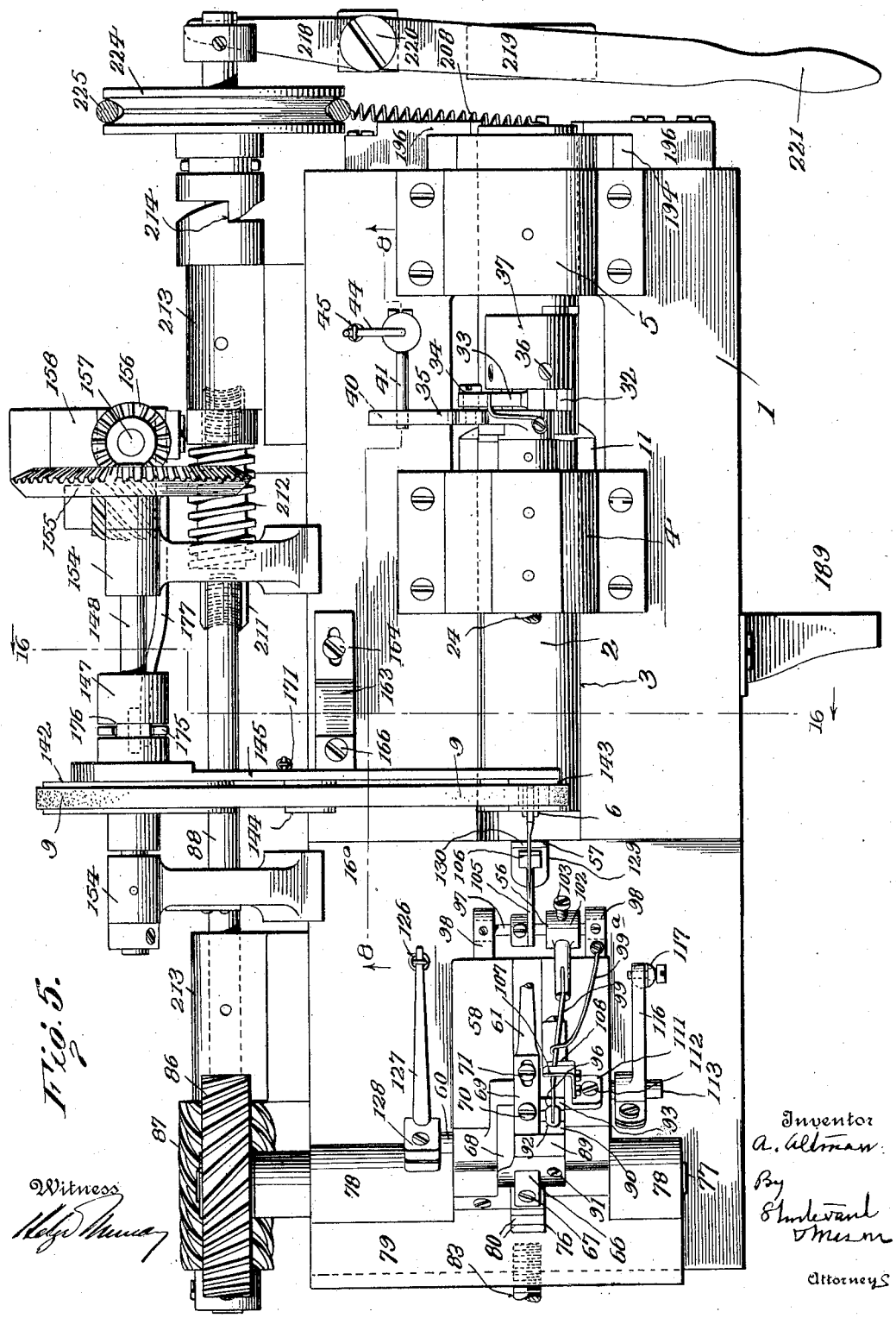

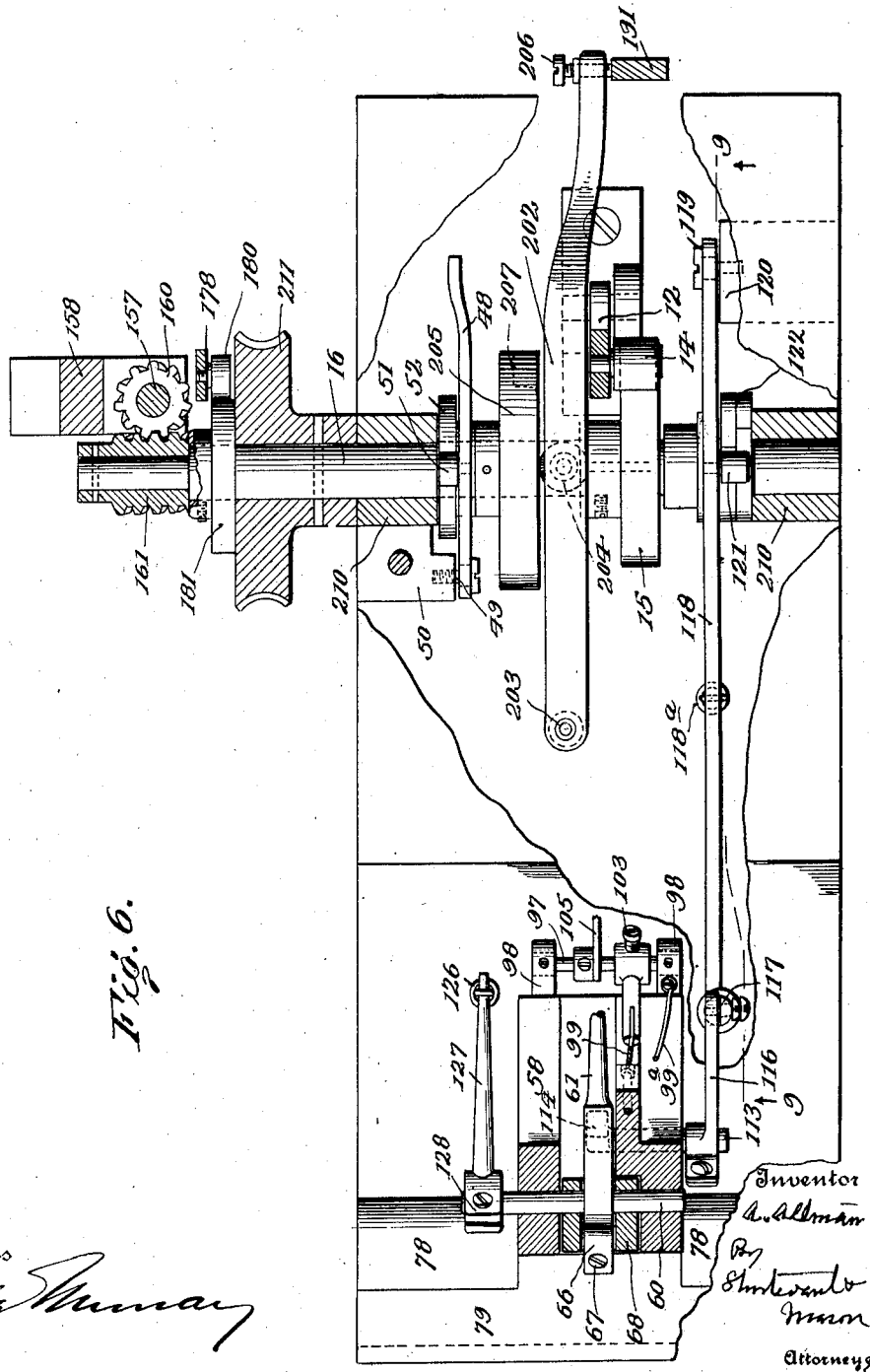

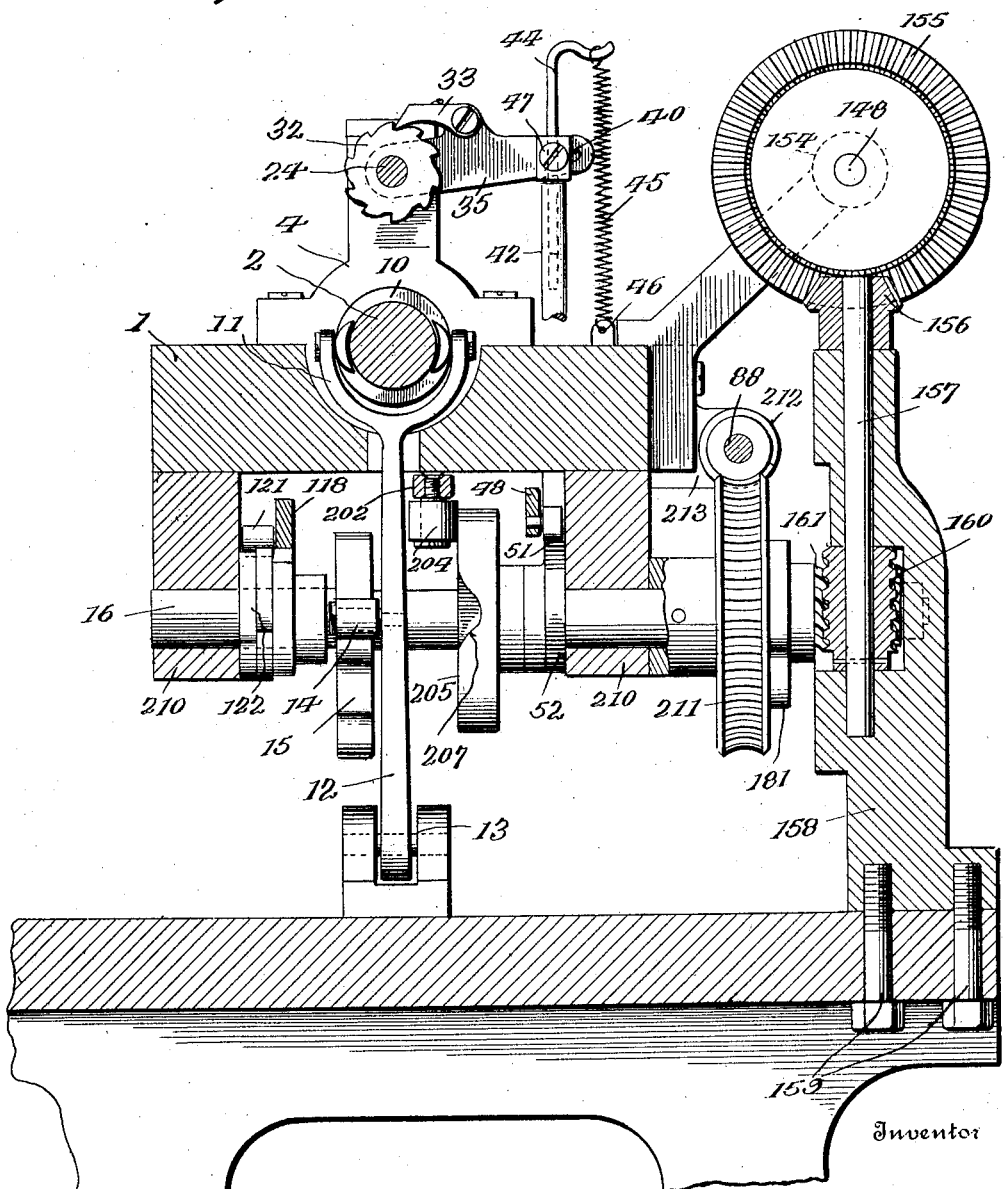

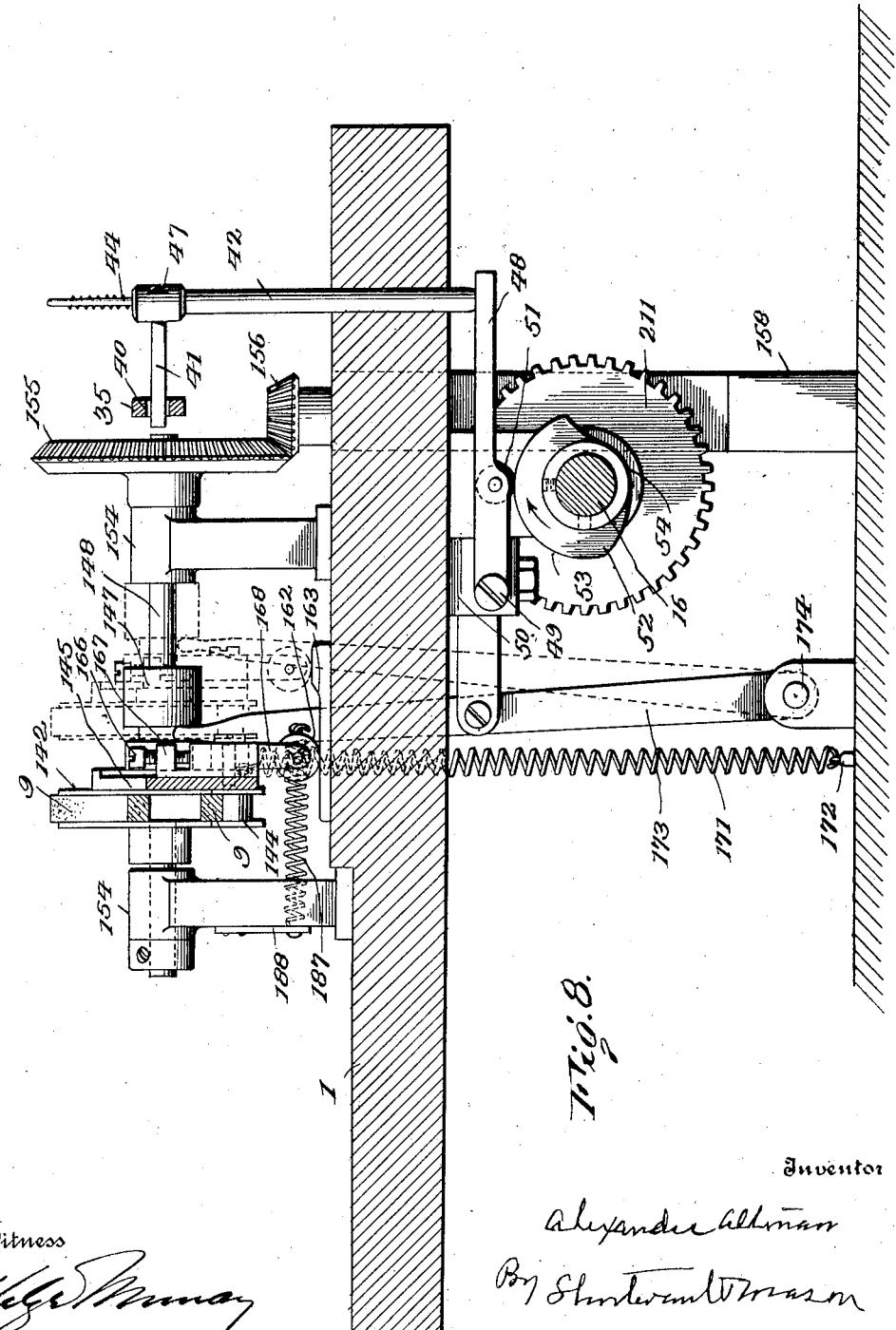

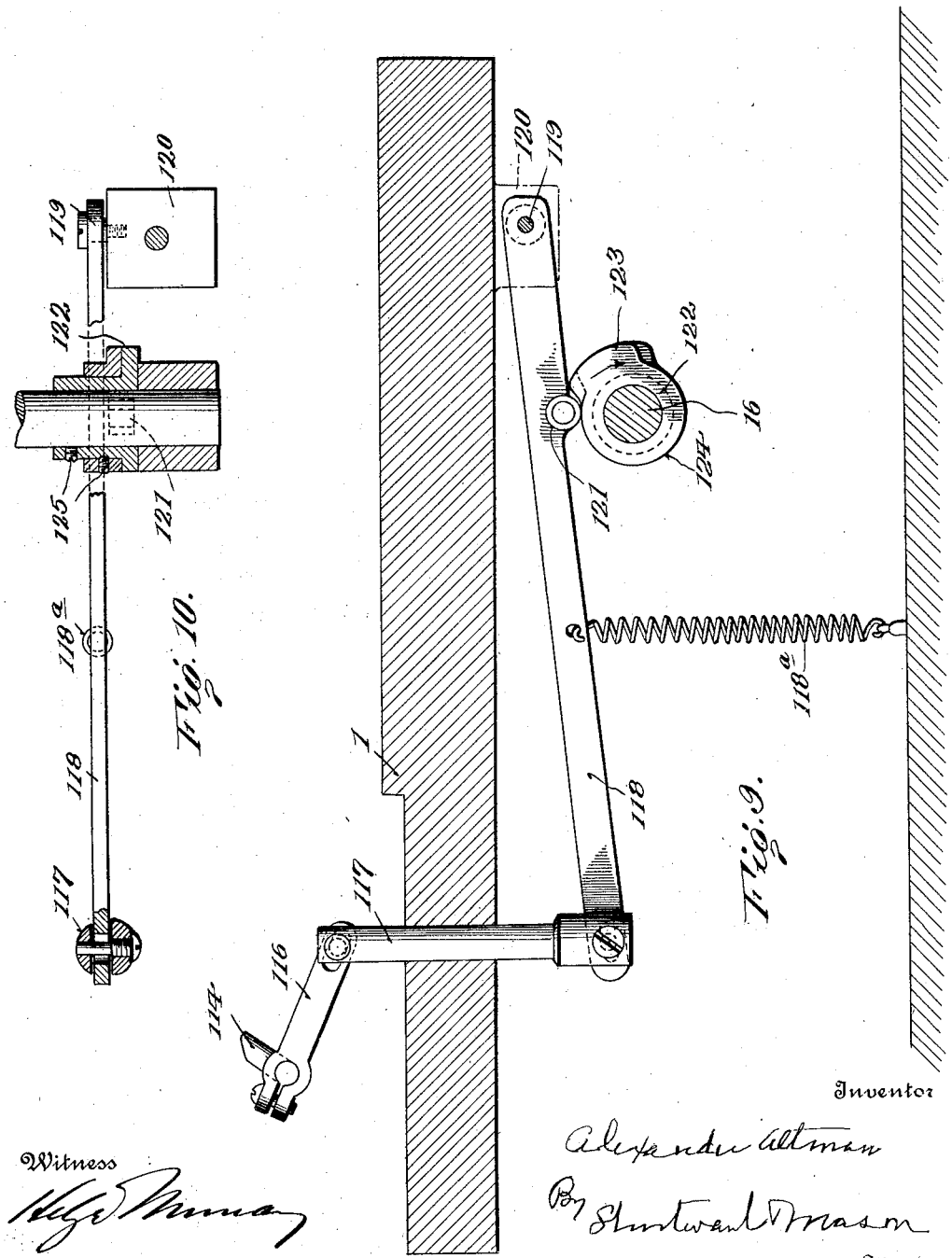

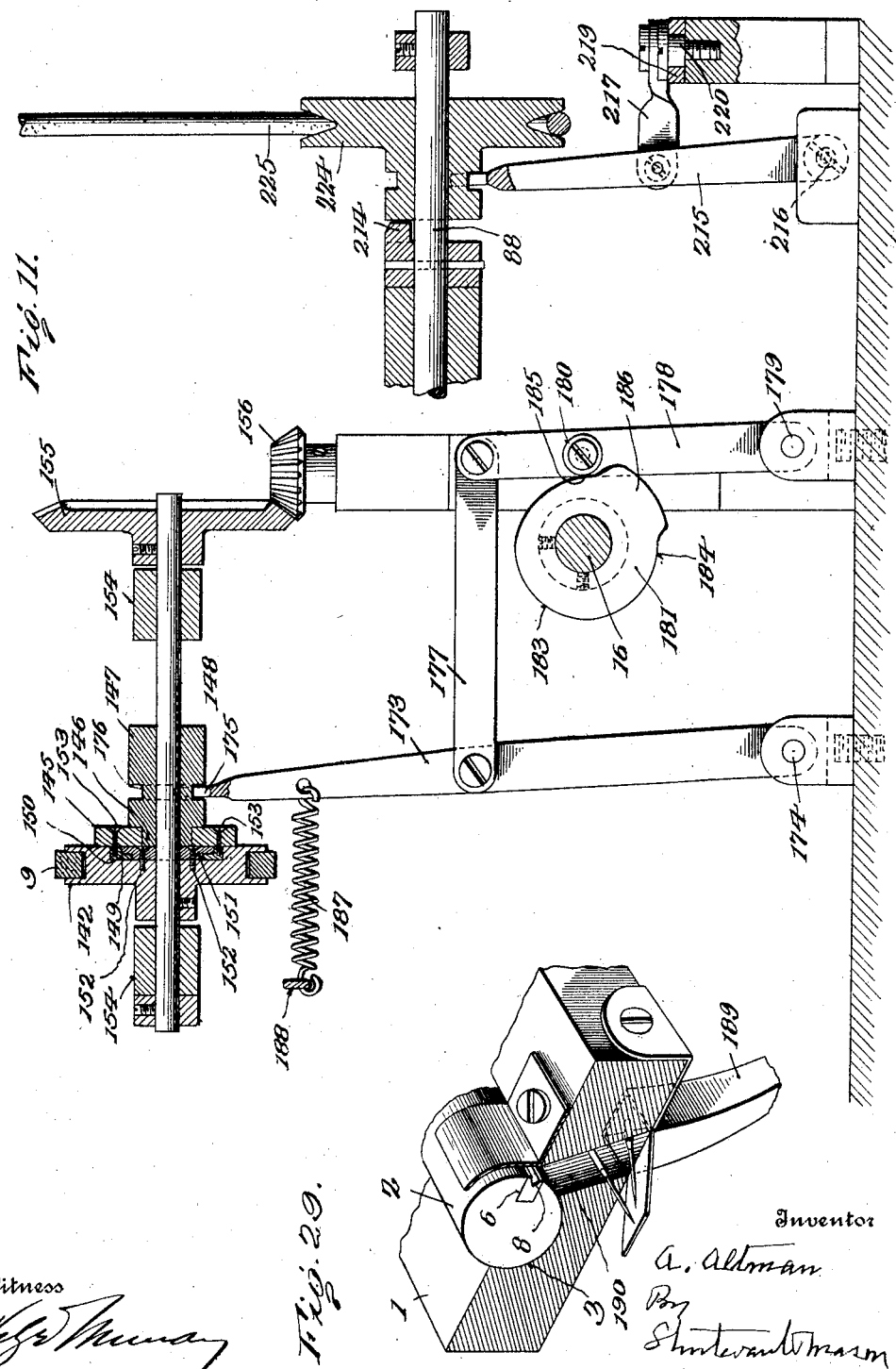

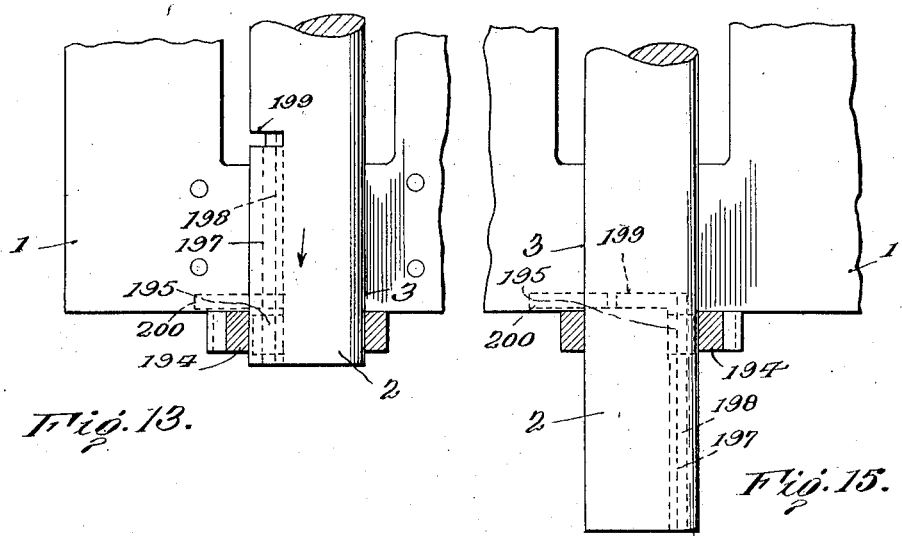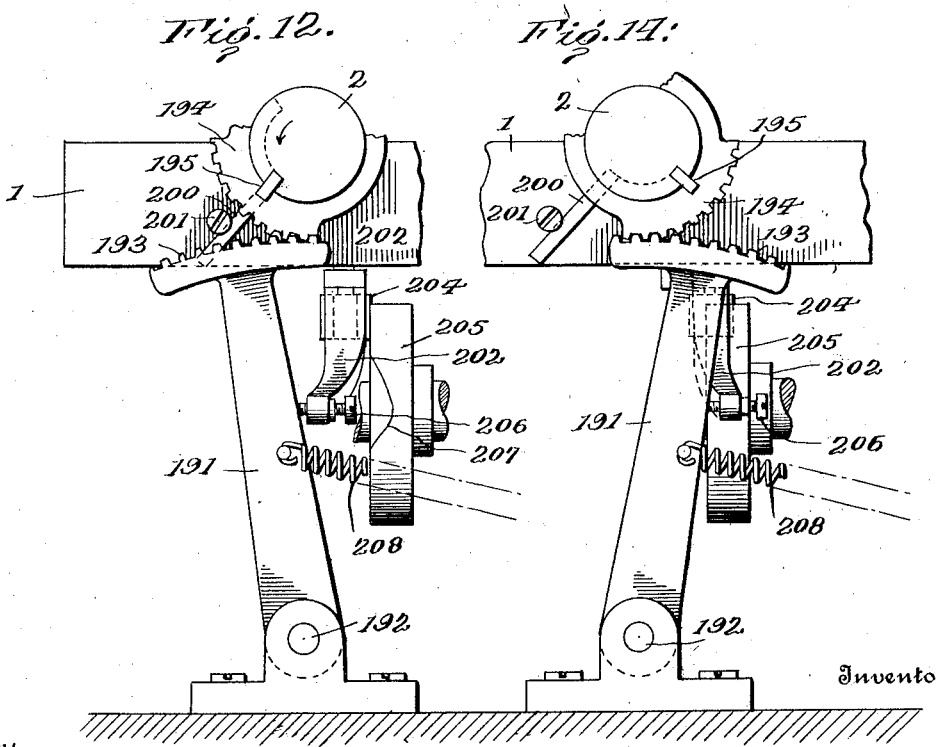

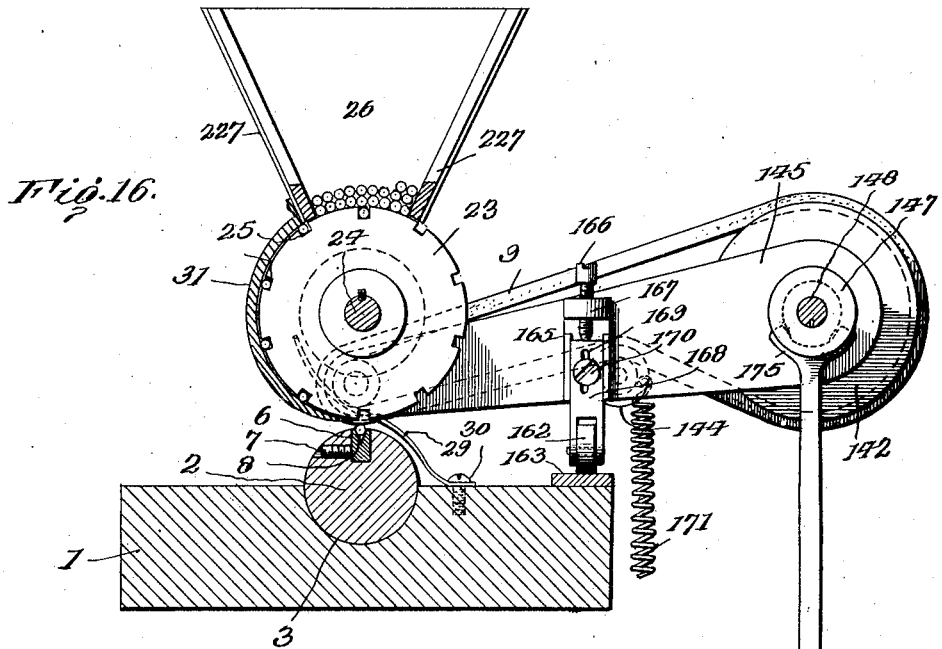
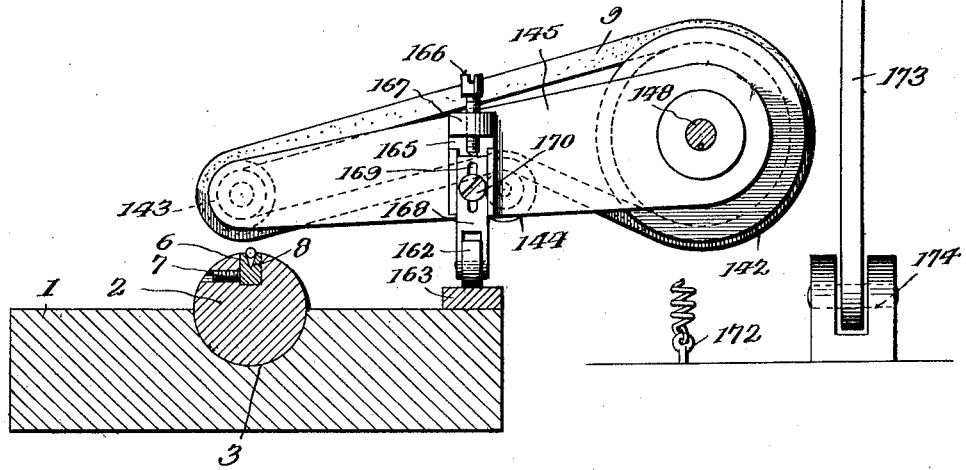

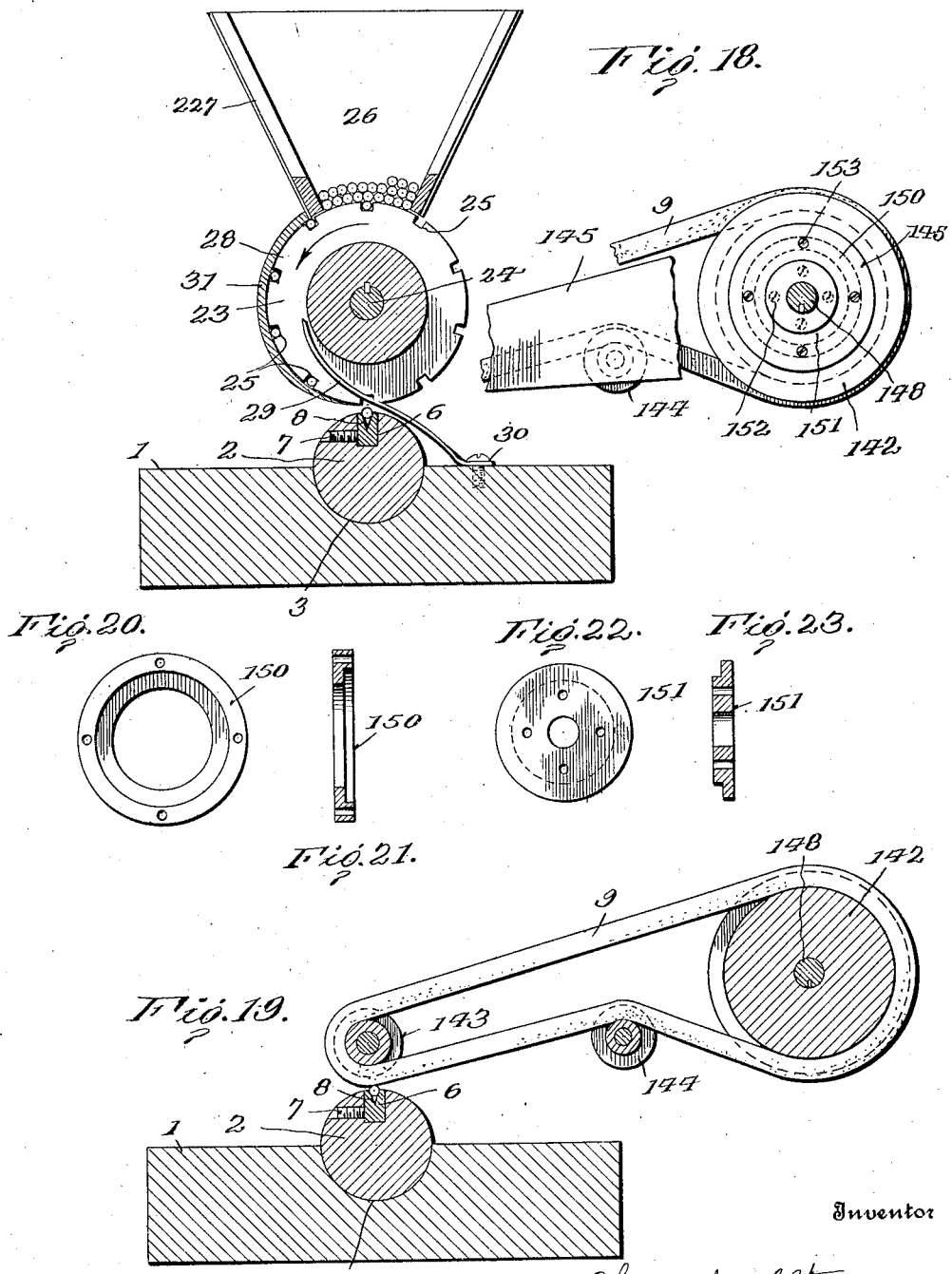

A. ALTMAN.
NEEDLE STRAIGHTENING MACHINE.
APPLICATION FILED FEB. 14, 1918.
1,361,515.
Patented Dec. 7, 1920.
16 SHEETS—SHEET 14.
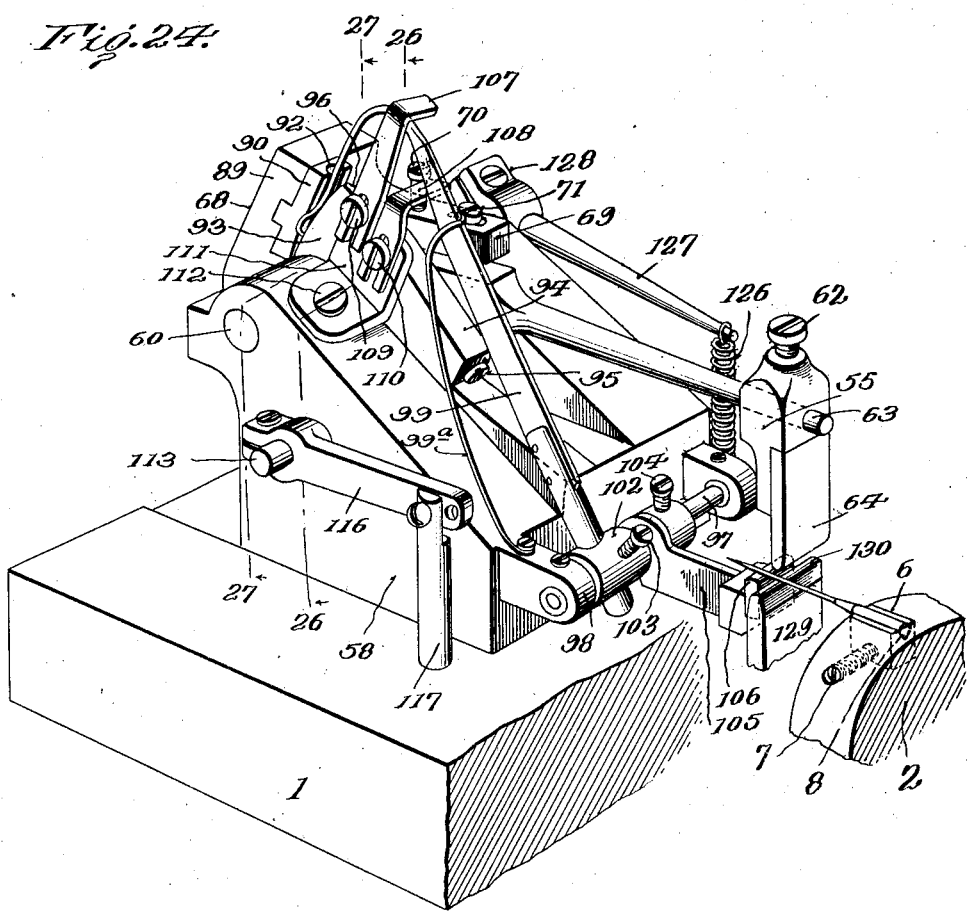
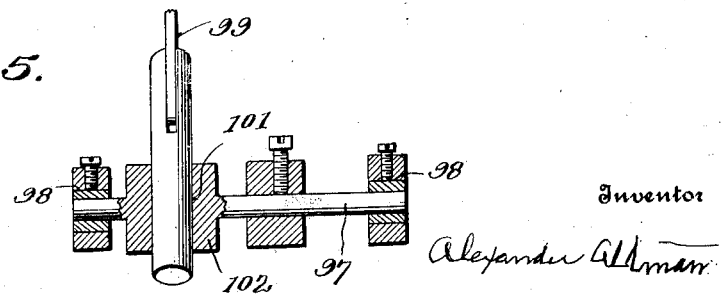

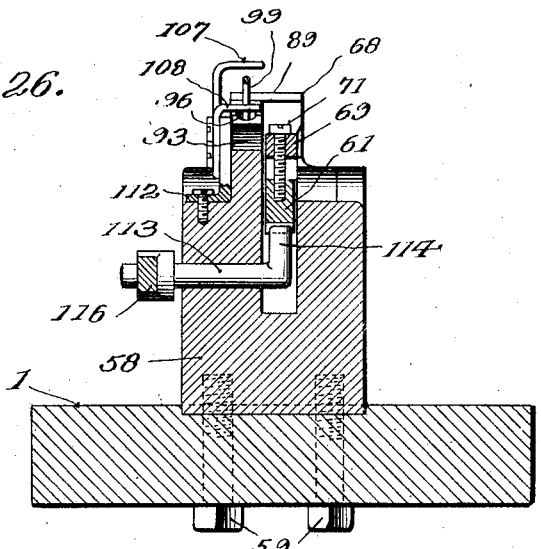
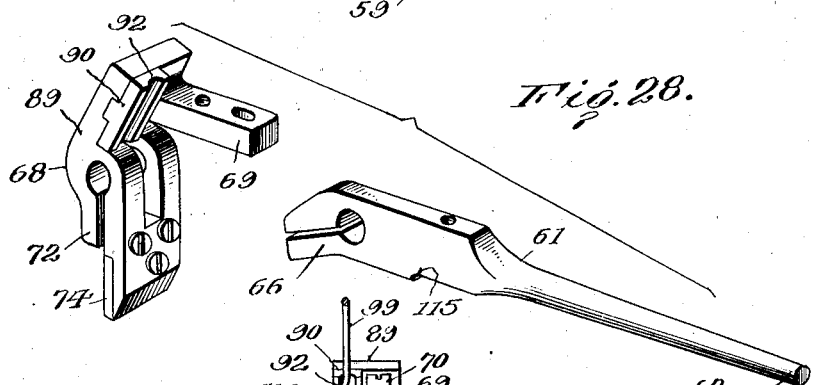
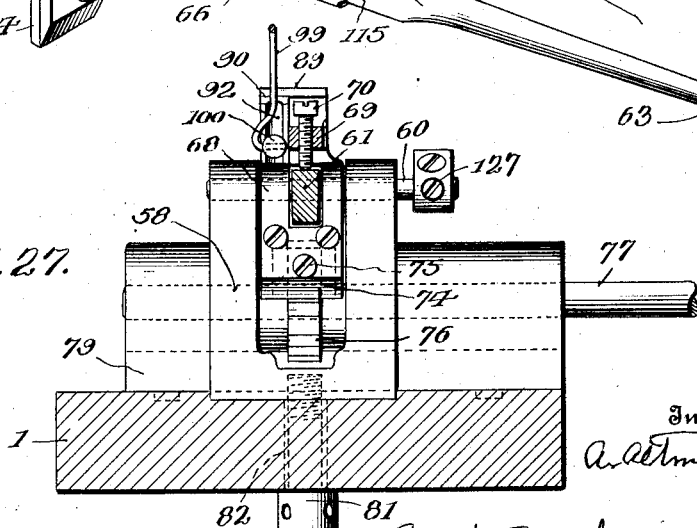

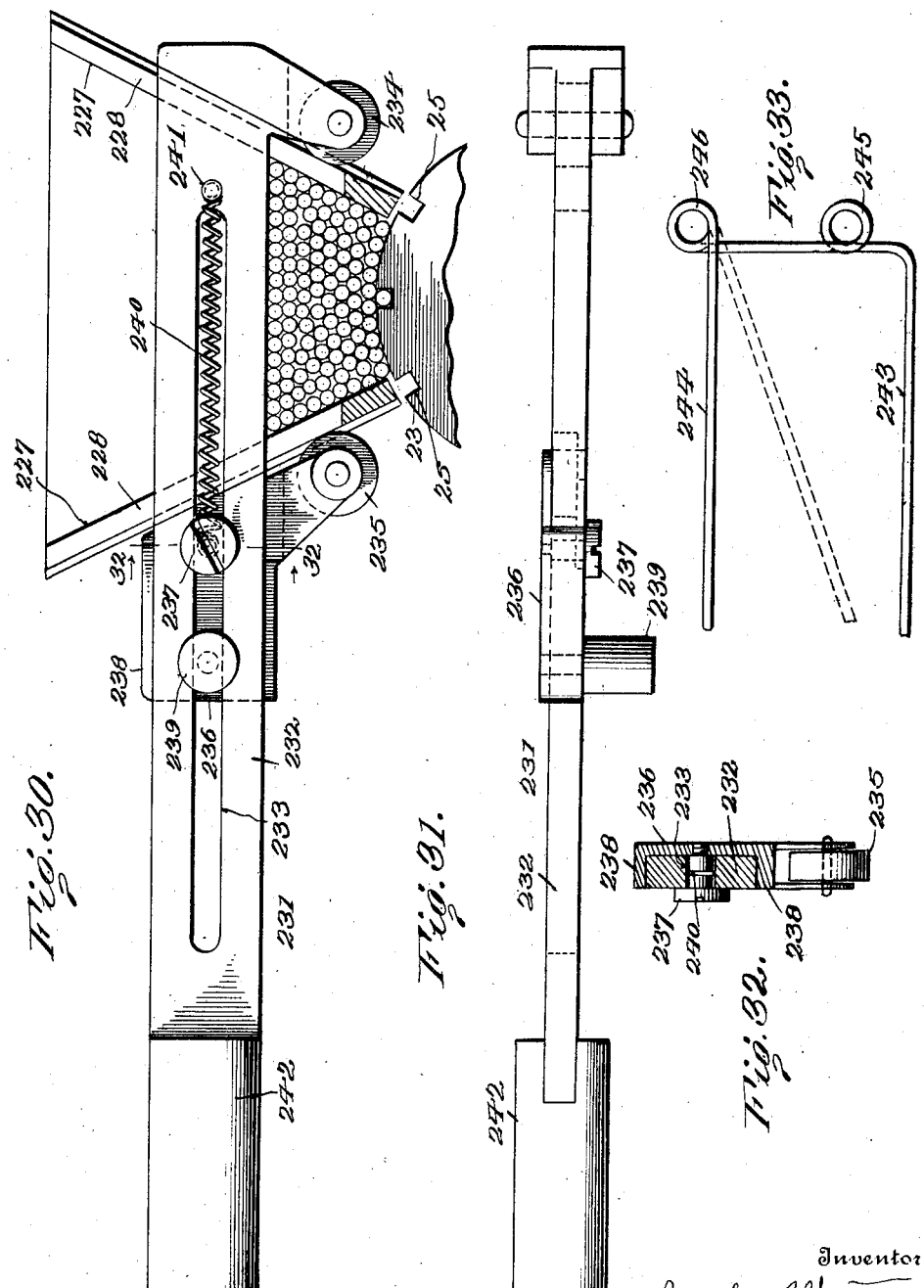

UNITED STATES PATENT OFFICE.

ALEXANDER ALTMAN, OF TORRINGTON, CONNECTICUT, ASSIGNOR TO THE TORRINGTON COMPANY, OF TORRINGTON, CONNECTICUT, A CORPORATION OF CONNECTICUT.

NEEDLE-STRAIGHTENING MACHINE.

1,361,515.     Specification of Letters Patent.     Patented Dec. 7, 1920.

Application filed February 14, 1918. Serial No. 217,182.

*To all whom it may concern:*

Be it known that I, ALEXANDER ALTMAN, a subject of the Emperor of Austria-Hungary, residing at Torrington, in the county of Litchfield, State of Connecticut, have invented certain new and useful Improvements in Needle-Straightening Machines, of which the following is a description, reference being had to the accompanying drawing and to the figures of reference marked thereon.

This invention relates to certain new and useful improvements in needle straightening machines, and contemplates more especially the production of a mechanism for removing the curves or crooks in round shank needles.

Attempts have been made to successfully remove the curves or crooks in sewing machine needles, but these have been attended with certain inaccuracies and complications due to inadequate sensitiveness of the needle crook detecting devices. The known forms at present comprise sliding blocks or wedges, the sides of which are adapted to slidingly coöperate with associated members for regulating the degree of the blow given by the straightening hammer. These blocks or wedges have a tendency to stick by reason of their frictional resistance, and thereby inaccurately transmit the proper setting for determining the strength of the blow of the straightening hammer.

It is an object of this invention to overcome these difficulties now experienced and provide a needle straightening machine having a highly sensitive mechanism capable of detecting all of the various crooks or curves found in a needle and subsequently effect the positive actuation of the straightening hammer causing it to deliver blows according to the degree of the curve or crook.

Another object of this invention is the production of a needle straightening machine having a positive needle crook detecting mechanism including a ball member designed to shiftably adjust itself between coöperating anvils for determining the strength of the blow to be imparted to the needle by the hammer.

Another object of the invention is to produce a needle straightening machine including in combination, a movable needle support, a straightening hammer controlled by a highly sensitive needle crook detecting mechanism, means for revolving the needle during the straightening operation, means for feeding the needle to the movable needle support, and means for discharging the needle therefrom after it has been straightened.

With these and other objects in view the invention further consists in the combination and arrangement of the several parts of the mechanisms hereinafter described and pointed out in the appended claims.

In the accompanying drawings which show by way of illustration my improved needle straightening machine, Figure 1 is a perspective view thereof.

Fig. 2 is a side elevation looking from the opposite side to that of the foregoing view.

Fig. 3 is an end elevation from the driving end of the machine.

Fig. 4 is a vertical sectional view through the machine, illustrating the movable needle support, straightening hammer and associated needle crook detecting mechanism, and the needle feeding hopper.

Fig. 5 is a plan view of the machine with the needle hopper removed.

Fig. 6 is a horizontal sectional view, illustrating the cam shaft and controlling levers, portions of the bed of the machine being broken away.

Fig. 7 is a detailed vertical sectional view on the line 7—7 of Fig. 2.

Fig. 8 is a vertical longitudinal sectional view on the line 8—8 of Fig. 5, illustrating the needle revolving mechanism and its relative reciprocation in full and dotted lines.

Fig. 9 is a detailed vertical longitudinal sectional view on the line 9—9 of Fig. 6, illustrating the cam and lever control for permitting the actuation of the straightening hammer.

Fig. 10 is a horizontal sectional view through the cam and lever control illustrated in Fig. 9.

Fig. 11 is a detailed vertical longitudinal sectional view, illustrating the cam and lever control for reciprocating the needle revolving means; and the clutch for controlling the operation of the machine.

Fig. 12 is a detailed end elevation of the needle support, and the controlling levers therefor, the said support being shown in its position when the needle is taken from the hopper and straightened.

Fig. 13 is a partial sectional plan view of the mechanism shown in Fig. 12.

Fig. 14 is a view similar to Fig. 12 illustrating the oscillated position of the needle support when the straightened needle is discharged therefrom.

Fig. 15 is a partial sectional plan view of the parts shown in Fig. 14.

Fig. 16 is a detailed transverse sectional view on the line 16—16 of Fig. 5 through the needle support and the mechanism for revolving the needle therein during the straightening operation.

Fig. 17 is a similar view with parts removed, illustrating the manner in which the needle revolving belt is lifted from the needle when the latter is not being straightened.

Fig. 18 is a transverse sectional view through the needle hopper and feeding drum, illustrating the manner in which the needle is delivered to the needle support.

Fig. 19 is a transverse sectional view showing the endless belt for revolving the needle while being straightened.

Figs. 20, 21, 22 and 23 are detailed views of the coöperating flanged members associated with the driving pulley of the endless belt.

Fig. 24 is a detailed perspective view of the straightening head, illustrating an operation of the needle support, the straightening hammer, and the needle crook detecting device.

Fig. 25 is a detailed horizontal sectional view through the supporting shaft of the needle crook detecting device.

Fig. 26 is a transverse vertical sectional view on a line 26—26 of Fig. 24 through the straightening head.

Fig. 27 is a similar view on a line 27—27 of Fig. 24.

Fig. 28 is a detached perspective view of the blow and hammer levers.

Fig. 29 is a detailed perspective view of the needle discharging chute, showing the manner in which the straightened needles are ejected with their shanks heading downwardly.

Fig. 30 is a side elevation of a form of needle clamp adapted to rest by gravity upon the needles in the hopper and insure their delivery to the needle feeding drum.

Fig. 31 is a top plan view of the needle clamp shown in Fig. 30.

Fig. 32 is a sectional view through the clamp on the line 32—32 of Fig. 30, and

Fig. 33 is another form of needle clamp constructed of a bent spring rod adapted to be inserted in the needle hopper for accomplishing the same purpose.

My invention has been primarily designed for use in straightening round shank needles. The needles are taken from a suitable hopper by a feeding drum and delivered in succession to a movable needle support. The needle support is reciprocatorily mounted in the bed of the machine and is adapted to move the needle over a needle crook detecting device and associated anvil, and beneath a relatively movable vibrating hammer. The needle is first brought inwardly, and then retracted slowly beneath the vibrating hammer. The straightening operation begins at a point near the shank of the needle and continues as the needle is retracted, ending at the point thereof.

The needle crook detecting device is designed to contact with the plate of the needle and transmit all curvatures or crooks therein to a relatively movable ball member which is designed to positively determine the degree of the blow imparted to the needle by the hammer during the straightening operation. This ball member is designed to freely roll between coöperating anvils. At each vibration of the hammer however, it is momentarily gripped in a positive manner between the anvils, at a point determined by the needle crook detecting device. The position of this ball member between the coöperating anvils determines the degree of the blow of the hammer transmitted to the needle, the intensity of the said blow being in proportion to the amount of the curvature or crook in the needle.

During the straightening operation the needle is revolved by means of an endless belt adapted to pass over the shank of the needle. This endless belt is mounted to reciprocate in timed relation with the needle support and is adapted to be lifted from the shank of the needle at times other than during the straightening operation, as will hereinafter appear.

Upon the completion of the straightening of the needle, the needle support is given an oscillatory movement and the needle is discharged through a suitable chute leading to the usual needle receiving pan.

The embodiment of my invention herein set forth comprises among other things, a reciprocating needle support, a needle straightening head including a vibrating hammer, a needle crook detecting finger and an anvil or block upon which the needle is straightened; a revolving mechanism including an endless belt for rotating the needle during the straightening operation, means for feeding the needles from a suitable hopper to the needle support; and means for ejecting the straightened needles and delivering them to the needle receiving pan.

Referring to the drawings in which similar reference characters designate corresponding parts, the machine comprises a bed 1, mounted upon standards or legs, which latter may be suitably secured to any form of table or bench support. Mounted to reciprocate within the bed 1 is a cylindrical needle support 2, the lower portion of which is adapted to move within a longitudinal semi-cylindrical recess 3 formed in the bed of the machine. Suitable bearings 4 and 5 are secured to the bed of the machine, and serve to retain and guide the needle support 2. (See Figs. 1, 2 and 4.)

"*Needle support.*"

The needle support is provided at one end thereof with a needle retaining block or die 6 secured by means of a screw 7 within a recess formed in the needle support. The needle retaining block 6 is provided with a groove 8 into which the major portion of the shank of the needle is designed to seat while the remaining portion thereof protrudes beyond this V groove and is arranged to be wiped by an endless belt 9, which serves to retain the needle within the V groove and revolve the same during the straightening operation, as will be hereinafter described. A spring 8ª may be secured to the end of the needle support 2, and serves to steady the needle in the V groove 8 when the endless belt 9 is not in contact with it.

The needle support 2 is provided intermediate the length thereof with a reduced portion 10 into which extends the forked end 11 of an actuating lever 12. The lever 12 may be pivoted to the bench or table support at 13, and is provided with a roller 14 coöperatively associated with the cam 15 secured to a suitable cross or cam shaft 16. The cam 15 is provided with a gradually increasing rise or surface 17, the purpose of which is to bear against the roller 14 and thereby gradually retract the needle support beneath the vibrating hammer during the straightening operation. (See Fig. 4.) At points 18 and 19 on said cam at the beginning and ending of the rise 17, are dead rest portions for permitting a slightly continuous vibration of the hammer near the shank and point ends respectively of the needle blade. The cam 15 is also provided with a nose 20, the purpose of which is to retract the needle support after the straightening operation, when discharging the straightened needle and receiving another needle from the feeding drum to be straightened. A suitable spring 21 is interposed between the lever 12 and a suitable support or clamp 22, which serves to keep the roller 14 against the cam 15, and thereby actuate the needle support when presenting a needle beneath the vibrating hammer to be straightened.

"*Needle feeding mechanism.*"

The unstraightened needles are fed to the needle support by means of an intermittently rotated feeding drum 23 keyed to one end of the shaft 24 mounted in the bearing 4 secured to the bed of the machine. (See Figs. 4 and 18.) The feeding drum 23 is provided with a series of notches or needle seats 25 into which a needle is delivered from a suitable hopper 26 secured to a bracket 27 which in turn is secured to the upper portion of the bearing 4. The feeding drum 23 is provided with an annular recess or groove 28 into which extends the end of a spring 29 secured to the bed of the machine at 30 (see Fig. 18.) This spring is designed to accentuate the delivery of the needle from one of the notches 25 into the V groove 8 formed in the needle retaining block 6. A shield 31 is secured to one side of the hopper, and is arcuately associated with the periphery of the feeding drum 23 for retaining the needles in the notches or seats 25 until delivered to the needle support.

The needle feeding drum 23 is intermittently rotated in the direction of the arrow shown thereon in Fig. 18, by a mechanism now to be described.

Referring to Figs. 1, 3, 4, 7 and 8, the shaft 24 is provided with a loosely mounted ratchet 32 adapted to be rotated by means of a spring pressed pawl 33 pivoted at 34 upon an arm 35 supported upon the shaft 24. Secured to the outer end of the shaft 24 by means of the screws 36 is a collar 37 in which are carried a series of spring pressed pins 38, the outer ends of which are rounded or curved and adapted to normally engage correspondingly curved recesses 39 formed in one side of the ratchet 32. (See Fig. 4.) By this construction it will be seen, that motion, when transmitted to the ratchet through the action of the pawl 33, will normally actuate the shaft 24. Should, however, a needle jam, or otherwise interfere with the proper rotation of the needle drum, it will be seen that the ratchet to which positive motion is transmitted will move, thereby pressing the spring pressed pins 38 out of the recess 39 in the ratchet, thereby allowing this mechanism to slip without affecting the other mechanisms of the machine.

Motion is transmitted to the spring pressed pawl 33 by a mechanism now to be described. Provided in the arm 35 to which the pawl 33 is pivoted, is a slot 40 into which projects a pin 41 carried by a vertically movable rod 42 mounted in an opening 43 of the bed 1. (See Fig. 8.) Extending upwardly from the rod 42 is a smaller rod 44 to the outer end of which is connected a spring 45, the end of which latter is secured at 46 to the bed of the machine. The smaller rod 44 extends downwardly into an opening formed in the rod 42 and is adjustably secured therein by means of a screw 47, which permits of regulating the tension of the spring 45. (See Fig. 7.)

The lower end of the rod 42 is designed to rest upon the outer end of a lever 48 pivoted at 49 to a bracket 50 depending from the bed of the machine. (See Fig. 8.) A roller 51 is carried by the lever 48, and is coöperatively associated with a cam 52 adjustably secured to the cross or cam shaft 16. The cam 52 is provided with a high portion 53 which when passing beneath the roller 51 serves to elevate the rod 42, thereby lifting the arm 35 and actuating the pawl 33. A low portion 54 is provided on the cam 52, and when this portion rides beneath the roller 51 the rod 42 will be lowered, the arm 35 retracted and the pawl 33 relatively moved over the teeth of the ratchet for another operation. The spring 45 interposed between the projecting arm of the smaller rod 44 and the connection 46 on the bed of the machine, serves to normally keep the rod 42 against the lever 48 which in turn keeps the roller 51 carried thereby, against the cam 52.

By this construction it will be seen that as the cam 52 is rotated in the direction of the arrow shown thereon in Fig. 8, the successive lifting and lowering of the lever 48 will impart a vertical reciprocatory motion to the rod 42 thereby oscillating the arm 35 and pawl 33 and relatively impart intermittent motion to the shaft 24 and feeding drum 23 carried thereby.

"*Needle straightening mechanism.*"

The mechanism for straightening the needle comprises a hammer 55, a needle crook detecting device 56, and an associated anvil or block 57 upon which the needle is straightened. Referring to Figs. 1, 2, 4 and 24 to 28 inclusive, the straightening mechanism comprises a head or block 58 secured to the bed of the machine by means of screws 59. Pivotally mounted within this block on a rock shaft 60 is the hammer lever 61 carrying the hammer 55. The hammer 55 is adjustably mounted by means of the screw 62 upon the reduced arm 63 of the hammer lever. A striking nose 64 is secured to the hammer 55 by means of a screw 65. The opposite arm 66 of the hammer lever is split and is adapted to be secured to the rocked shaft 60 by means of a screw 67.

Secured to the rock shaft 60 is a coöperating blow lever 68 having an arm 69 through which passes an adjusting screw 70 and a fastening screw 71 adapted to adjustably attach the hammer lever 61 to the blow lever 68. (See Fig. 28.) The blow lever 68 is formed with the depending split arm 72 which permits of it being clamped to the rock shaft 60 by means of the screw 73, as shown in Fig. 4. Upon the lower end of the arm 72 of the blow lever is secured an impact nose 74 secured thereto by means of the screw 75. This impact nose 74 of the blow lever is coöperatively associated with a blow wheel 76 keyed to a shaft 77 journaled in bearings 78 provided on an adjustable slide 79 positioned upon the upper surface of the bed 1. The blow wheel 76 is provided with a series of projections or teeth 80, the functions of which are to successively strike the impact nose 74 of the blow lever thereby oscillating the rock shaft 60 and imparting a vibratory motion to the hammer 55 as will be presently described.

The slide 79 which carries the blow wheel 76 is secured to the bed 1 of the machine by means of the locking screw 81 adapted to pass through a slot 82 formed in said bed for holding the slide thereon in adjusted position. (See Fig. 2.) The slide 79, and in turn the blow wheel 76 are adjustable with relation to the blow lever 72 by means of the screw 83 extending into the slide 79 being held in a relatively fixed position in the bifurcated end 84 of a bracket 85 secured to the bed of the machine. (See Figs. 1 and 2.)

The blow wheel 76 which is keyed to the shaft 77 is continuously rotated in the direction of the arrows shown thereon in Fig. 4, when the machine is in operation. Motion is imparted to the blow wheel by means of the spiral gear 86 keyed to the shaft 77, and adapted to mesh with a similar gear 87 secured to the main shaft 88 of the machine. This main shaft 88 and the transmission of the power to the machine will be described hereinafter.

The blow lever 72 is provided with an upwardly extending arm 89 to which is secured an anvil 90 by means of a screw 91. This anvil 90 is provided with a groove 92 of semi-cylindrical formation in cross section. A coöperating anvil 93 is relatively positioned in proximity to the anvil 90 and is secured to an upwardly extending projection 94 of the head 58, by means of a screw 95. This anvil 93 is provided with a groove 96 of semi-cylindrical formation in cross section, said groove being arcuately formed about the pivotal support of the needle crook detecting member 56 now to be described.

The needle crook detecting device 56 comprises a lever pivotally supported upon the shaft 97, which latter is journaled in suitable bushed bearings 98 extending from the head 58 hereinbefore referred to. (See Figs. 24 and 25.) The pivotally mounted lever of the needle crook detecting device comprises an upwardly extending arm 99 the upper extreme end of which is bent downwardly and has loosely mounted upon the end thereof a ball member 100. This ball member 100 is relatively mounted within the grooves 92 and 96 of the anvils 90 and 93 respectively. The ball is revolubly mounted upon the extreme end of the arm 99 and is free to ride upon the anvil 93 within the groove 96 formed therein. The arm 99 is adjustably mounted in an opening 101 formed in an enlarged portion 102 of the shaft 97. A screw 103 serves to secure the arm 99 in adjusted position. Secured to the head 58 is a spring 99ª, one end of which is designed to engage the arm 99 and maintain an engaging nose 106 to be presently described, in contact with the needle.

The needle crook detecting device 56 is further provided with an arm 105 adjustably secured to the shaft 97 by means of the screw 104. This arm 105 comprises the needle crook detecting finger, the outer end of which is provided with an engaging nose 106 designed to contact with the blade of the needle and impart all curvatures and crooks therein to the ball member 100 for determining the amount of the blow of the hammer, as will be presently described.

Suitable adjustable stops 107 and 108 are provided above and below the upper end of the arm 99 of the needle crook detecting device. (See Fig. 24.) These stops are adjustably mounted by means of screws 109 and 110 respectively, which are designed to pass through bifurcated ends of the respective stops, and secure the same in place upon a bracket 111 secured to the head 58 by means of a screw 112. The purpose of these stops is to limit the movement of the arm 99 when the needle is presented for straightening, should the curvature of the needle suddenly impart an excess movement to the ball member 100 tending to relatively dislocate the same within the respective grooves 92 and 96 of the anvils 90 and 93.

In operation it will be seen that as the needle crook detecting finger 105 is rocked by reason of the curves or crooks in the needle, the arm 99 will be correspondingly raised or lowered, thereby shifting the position of the ball member 100 within the arcuately formed groove 96 of the anvil 93. When the ball is shifted in an upward direction, heavier blows will be imparted to the needle blade by means of the hammer 55. When the ball is moved in a downward direction, lighter blows will be transmitted to the blade of the needle by the hammer 55. Referring to Fig. 4 of the drawings it will be seen that as the blow wheel is rotated in the direction of the arrow shown thereon the impact nose 74 of the blow lever will be successively struck by the teeth or projections 80 upon said blow wheel, thereby moving the upper arm 89 of the blow lever and causing the anvil 90 to grip the ball member 100 in its shifted position. The position of the ball when gripped between the anvils 90 and 93 determines the amount of blow to be given the needle by the hammer.

The hammer 55 is designed to deliver blows to the blade of the needle during the straightening operation, but during the time that the needle is being delivered to the straightening head, the hammer is out of operative straightening contact with the blade of the needle. The mechanism for controlling the operative movement of the straightening hammer comprises a shaft 113 journaled in the head 58. The inner end of the shaft 113 is provided with an arm 114, the purpose of which is to elevate the hammer when an unstraightened needle is being delivered to the straightening head, and to lower the said hammer into operative vibrating contact with the blade of the needle during the straightening operation. The arm 114 is adapted to bear against the under side of the hammer lever 61 as at 115 in effecting these movements. (See Figs. 4 and 26.)

The shaft 113 has clamped to its outer end an arm 116 to the slotted outer end of which is secured one end of a vertically disposed rod or link 117 adapted to pass through the bed 1, and be connected to one end of a lever 118 pivoted at 119 to a depending bracket 120 on the bed of the machine (see Figs. 9 and 10). The lever 118 carries a roller 121 designed to bear upon a cam 122 adjustably secured to the cross or cam shaft 16. The cam 122 is provided with a high portion 123, and a low portion 124. This cam 122 is formed of two parts, each of which is relatively adjustable by means of the screws 125 (see Fig. 10). A spring 118ª acts to keep the roller 121 in operative contact with the cam 122.

When the cam is rotated in the direction of the arrow shown thereon in Fig. 9 and the roller is affected by the low portion 124 of the cam 122, it will be seen that the lever 118 is in its lowermost position, thereby depressing the rod or link 117 and in turn oscillating the shaft 113 which causes the arm 114 carried thereby, to move away from the under side of the hammer lever 61, and permit the free operative vibratory contact of the hammer 55 with the blade of the needle. When the roller 121 is elevated by reason of the high portion 123 of the cam 122 moving thereagainst, it will be seen that the lever 118 will be elevated, thereby lifting the rod or link 117, and in turn oscillating the shaft 113, which causes the arm 114 carried thereby to bear against the underside of the hammer lever 61 and elevate the hammer 55 from operative vibratory contact with the blade of the needle.

The intensifying of the vibration of the hammer 55 is obtained by means of a spring 126 one end of which is secured to the bed of the machine, and the other end of which is attached to the end of an arm 127 secured to the rock shaft 60 by means of a clamp 128 (see Figs. 1, 5 and 24). The purpose of this spring is to normally hold the impact nose 74 of the blow lever secured to the rock shaft 60 against the blow wheel 76. It will be seen that as the blow wheel is rotated in the direction of the arrows shown thereon in Fig. 4 the blow lever will be successively moved thereby oscillating the rock shaft 60 and causing the arm 127 secured thereto to be elevated against the tension of the spring 126, as will be readily understood. The retracting action of the spring 126, as the projections or teeth of the blow wheel leave the impact nose 74 of the blow lever, will act to intensify the vibratory blow imparted to the needle through the action of the hammer 55.

The anvil or block 57 upon which the needle is straightened, is coöperatively associated with the needle crook detecting finger 105 and the hammer 55, and comprises a member 129 the upper end of which is provided with a nose 130 adapted to receive the hammering action imparted to the blade of the needle. The member 129 is secured to an adjustable standard 131 by means of a screw 132. The adjustable standard 131 is vertically movable within a sleeve or bushing 133 secured by a driving bit into the bed of the machine (see Fig. 4). The movable standard 131 is internally screw-threaded as at 134, and is adapted to receive the upper screw-threaded end 135 of the rod 136 rotatably secured in a base block 137 secured to the bench or table support. The rod 136 is provided with a turning head 138 pinned thereto. A collar 139 is also pinned to the rod 136 in the bifurcated portion 140 of the base member 137. A locking nut 141 is provided upon the screw-threaded portion 135 of the rod 136 and serves to hold the standard 131 in adjustable position.

To adjust the anvil or block 57, the locking nut 141 is loosened and the turning head 138 pinned to the rod 136, moved in the direction desired. As this turning head is moved, it will be seen that the screw-threaded portion 135 of the rod 136 will elevate or lower the standard 131 carrying the member 129, thereby bringing the anvil into the desired position with relation to the vibrating hammer and needle crook detecting device.

"*Needle revolving means.*"

The mechanism for revolving the needles comprises the endless belt 9 hereinbefore mentioned, which is adapted to pass over a driving pulley 142, a supporting pulley 143 and an idler pulley 144. (See Figs. 1, 5, 8 and 16 to 19). The supporting pulley 143 is mounted at the end of a movable arm 145, over the needle retaining block 6. The arm 145 is loosely mounted upon the reduced end 146 of a sleeve member 147 slidably mounted upon a shaft 148 through which motion is transmitted to the endless belt 9. (See Fig. 11). The driving pulley 142 is slidably keyed to the shaft 148, and is provided with a recessed portion 149 into which a flanged member 150 is positioned. A coöperating flanged member 151 is secured to the driving pulley 142 by means of screws 152. Suitable screws 153 serve to secure the flanged member 150 to the arm 145. By this construction it will be seen that the driving pulley 142 is free to rotate with the shaft 148 and at the same time permit of the arm 145 slightly rocking, and in addition reciprocate the said driving pulley upon the shaft 148 as will be presently described.

The shaft 148 is mounted in suitable bearings 154 secured to and extending upwardly from the bed of the machine. Motion is transmitted to the shaft 148 through the beveled gear 155 secured thereto, adapted to mesh with a similar pinion 156 provided on the upper end of the shaft 157 (see Fig. 7). The shaft 157 is mounted on a vertical standard 158 secured to the bed of the machine by means of screws 159. A spiral gear 160 is pinned to the shaft 157, and is adapted to mesh with a similar gear 161 secured to the cross or cam shaft 16 hereinbefore referred to. It will be seen, that as the cam shaft is rotated, motion is transmitted through the spiral gears 161 and 160 to the vertical shaft 157 and the beveled pinion 156 and thence to the beveled gear 155 causing the shaft 148 to revolve. This shaft is continuously revolved during the operation of the machine.

As has been hereinbefore mentioned the endless belt 9 is designed to bear upon the shank of the needle in the V groove 8 formed in the retaining block or die 6, and impart a rotary motion thereto. There are times however, when the endless belt 9 is slightly elevated so as to permit the needle being delivered to the needle support from the feeding drum 23, and be discharged therefrom after the straightening operation.

The means for elevating the endless belt from the needle includes the arm 145 which is designed to rock about the shaft 148 through the action of a roller 162 arranged to ride upon a cam surface 163 in the nature of an adjustable plate secured to the bed of the machine by screws 164. (See Figs. 5 and 8.)

The roller 162 is adjustably mounted in a guide block 165 secured to the arm 145. An adjusting screw 166 passes through an extension 167 of the guide block 165, and bears upon the upper end of the standard 168 in which the roller 162 is mounted. (See Figs.

8, 16 and 17.) The standard 168 is slotted as at 169 and a locking screw 170 is designed to pass through said slot and into the standard for holding the roller in its adjusted position. A spring 171 is connected to the arm 145, and an eye bolt 172 secured to the bench or table support for keeping the roller 162 in positive contact with the cam plate 163.

The adjustment of the roller 162 will determine the amount of pressure or frictional engagement of the belt 9 with the shank of the needle.

The belt 9 is also arranged to reciprocate in timed relation with the needle support; for maintaining the needle in the V groove 8 of the retaining block 6.

The machine for reciprocating the belt 9 includes a lever 173 pivoted at 174 to the bench or table support. (See Figs. 8, 11 and 16.) The upper forked end 175 of this lever 173 is designed to fit within an annular groove 176 formed in the sleeve 149 slidingly mounted upon the shaft 148. Connected to the lever 173 intermediate its length, is one end of a link 177, the other end of which is loosely connected to the upper end of another lever 178 pivoted at 179 to the bench or table support. The lever 178 has supported thereon a roller 180 coöperatively associated with a cam 181 adjustably secured to the cross or cam shaft 16.

As shown in Fig. 11, the cam 181 is provided with a gradually increasing rise or surface 183 provided with dead rest portions 184 and 185 at the beginning and end thereof, of the same general design as those provided in the cam 15 for controlling the reciprocation of the needle support, as hereinbefore described. An enlarged portion 186 is also provided in the cam 181, which acts to quickly retract the belt 9 in timed relation with the needle support a predetermined distance after the straightening operation, which distance, however, is short of the full travel of the needle support. The stopping of the outward reciprocation of the belt 9 short of the complete outward travel of the needle support, permits of the introduction of another needle to the needle support and the free discharge of the straightened needle.

In operation, it will be seen that as the cam 181 is rotated in the direction of the arrow shown thereon in Fig. 11, the lever 178 will be rocked, thereby causing the lever 173 through the link connection 177 to be correspondingly moved. This in turn reciprocates the sleeve 149 and the driving pulley 142 which is attached thereto by the flanged members 150 and 151 hereinbefore described. A spring 187 is connected to the lever 173 and to an extending arm 188 secured to the standard of one of the bearings 154 (see Figs. 8 and 11,) and serves to keep the roller 180 against the cam 181 for permitting the effective reciprocation of the belt 9.

"*Discharge mechanism.*"

After the straightening operation the needle is discharged through a suitable chute 189 secured to the bed of the machine (see Figs. 2 and 29). An opening 190 is provided in the bed 1 through which the straightened needle passes after being ejected from the needle support.

Referring to Figs. 3, and 12 to 15 inclusive, the mechanism for ejecting the straightened needle includes an arm 191 pivoted at 192 to the bench or table support, having at its upper end a toothed segment 193 adapted to mesh with a segmental gear 194 provided with a long key-way and keyed at 195 to the needle support, the latter being designed to oscillate through the segmental gear 194 as will presently appear. The segmental gear 194 is positioned against the end of the bed of the machine and is held in place by means of flanged or angle members 196 secured to the end of the bed (see Fig. 5). These serve to hold the segmental gear 194 in place while the needle support 2 is reciprocated.

Formed in the needle support 2 is an angularly arranged key-way 197 the longitudinal portion 198 of which is of a length commensurate with the complete reciprocatory path of travel of the needle support, and the transverse or arcuate portion 199 of which is arranged so as to become operative at the end of the travel of the needle support in an outward direction, as indicated by the arrow in Fig. 13. A key 200 is secured in the bed of the machine by means of a screw 201 and extends into engagement with the key-way 197. As shown in Fig. 13 this key 200 is designed to hold the needle support 2 against rotation during its reciprocatory motion, and as shown in Fig. 15, is arranged to permit of the needle support 2 being oscillated by the segmental gear 194 and meshing tooth segment 193 hereinbefore described. In the first instance the key 200 operates in the longitudinal portion 198 of the key way 197, and in the second instance it operates within the transverse or arcuate portion 199 of the said key way 197.

The controlling mechanism for effecting the partial turning of the needle support at the time of discharging a straightened needle includes a lever 202 pivoted at 203 to the under side of the bed of the machine (see Fig. 6). The lever 202 is provided with a roller 204 designed to coöperate with a cam 205 secured to the cross or cam shaft 16. The outer end of the lever 202 is slightly curved and is provided with an adjustable screw 206 the end of which is arranged to bear upon one side of the lever 191 provided with the toothed segment 193.

The cam 205 is formed with a side and peripheral depression 207 having gradual inclined surfaces into and against which the roller 204 rides in timed relation with the other mechanism of the machine. As shown in Fig. 12, the roller 204 is riding upon the major or even surface of the cam, and when in this position the needle support is receiving, positioning and straightening a needle. In the position shown in Fig. 14, the roller 204 has been moved into the depression 207 of the cam 205, thereby causing the lever 191 to rock, and imparting an oscillating movement to the needle support through the action of the tooth segment 193 and meshing segmental gear 194, when a straightened needle is being ejected and discharged into the chute 189. In this position the arcuate portion 199 of the key-way 197 permits of the rotary movement as has been described. This oscillating movement is quick in that the roller 204 rapidly leaves the cam depression 207, thereby returning the needle support to its normal reciprocatory position.

A spring 208 is connected to the lever 191, and a rod 209 extends from the bed of the machine (see Fig. 3) for effectively keeping the roller 204 against the cam 205.

In operation, the needle support 2 is retracted slowly during the straightening operation, and more rapidly immediately following the same, until it assumes its limit of outward travel shown in Fig. 15, at which time the roller 204 rides into the depression 207, of the cam 205 which rotates continuously, thereby allowing the spring 208 to pull the lever 191 and toothed segment 193, and impart an oscillatory movement to the needle support. The turning of the needle support approximately a quarter turn, allows the needle to drop from the V groove 8, into the discharge chute as shown in Fig. 29, the shank of the needle heading downwardly and entering the needle receiving pan first. As soon as the straightened needle is ejected the needle support 2 is quickly returned by reason of the roller 204 leaving the depression 207 of the cam 205, thereby presenting the V groove 8 in the needle retaining block 6 beneath the feed drum 23 for the reception of another needle to be straightened.

"*Main driving mechanism.*"

The cross or cam shaft 16 to which the several cams for controlling the operation of the hereinbefore described mechanism are secured, is mounted in suitable bearings 210 depending from the bed of the machine (see Fig. 7).

Motion is transmitted to the cam shaft by means of a worm gear 211 secured thereto, and adapted to mesh with a worm 212 secured to the main driving shaft 88 of the machine hereinbefore referred to. The main shaft 88 is supported in suitable bearings 213 secured to the bed of the machine (see Fig. 1) and is provided with a clutch 214, the operation of which starts and stops the machine.

The clutch 214 is controlled by a lever 215 pivoted at 216 to the bench or table support, and has connected thereto a link 217 which in turn is connected to one end 218 of a controlling lever 219. The controlling lever 219 is pivoted at 220 upon a support extending from the bench or table, and is provided with a handle portion 221 which may be gripped when starting and stopping the machine.

A spring holding device 222 is provided upon the bed of the machine for holding a detent 223 carried by the controlling lever in the position desired with the clutch in or out. (See Fig. 2.)

The driving pulley 224 is loosely mounted upon the main shaft 88 and receives a driving belt 225 leading from any suitable source of power. (Not shown.) When the clutch 214 is engaged, the driving pulley 224 imparts motion to the main shaft 88, from which motion is derived for the several other mechanisms.

"*Needle hopper and clamp.*"

The needles to be straightened are placed in the hopper 26 supported by means of the bracket 27 secured to the bearing 4 hereinbefore referred to (see Fig. 4).

The hopper is formed with oppositely inclined side walls 227 each of which is provided with a slot 228 through which the needle clamp 231, to be presently described, extends. A bottom 229 is secured to said hopper and terminates short of the needle feeding drum 23. An adjustable guide 230 may also be mounted in said hopper to keep the needles properly alined. The needles are placed in the hopper with their shanks over the feeding drum 23, and a needle clamp 231 positioned thereon as shown in Figs. 30, 31 and 32.

The needle clamp 231 comprises a bar 232 having a slot 233 therein, and coöperating rollers 234 and 235 arranged to ride upon the outer faces of the inclined walls of the hopper. The roller 234 is pivotally mounted in a downwardly extending end of the bar 232, and the roller 235 is pivotally carried by a spring actuated member 236 slidably mounted upon the bar 232. The spring actuated member 236 is slidingly mounted upon the bar 232, by means of a headed screw 237 designed to pass through the slot 233 in said bar 232. Suitable flanges 238 are formed on the member 236 and serve to guide it upon the bar 232. A thumb-piece or extension 239 is carried by the spring actuated member 236 and extends through the slot 233 to the outside of the bar 232. This thumb-piece can be gripped by the hand and the roller 235 retracted against the tension of the spring 240, one end of which is secured to the headed screw 237, and the other end of which is attached at 241 to the bar 232. A handle 242 may be provided on the bar 232.

From the foregoing description it will be seen that when the clamp is positioned in the hopper as shown in Fig. 30, the underside of the bar 232 will bear upon the shank of the needles, by reason of the spring 240 acting to draw the roller 235 carried by the member 236 downwardly against the inclined wall of the hopper. The opposite roller 234 is also drawn downwardly, thereby producing a sufficient pressure or clamping action upon the needles to insure their seating in the notches or seats 25.

As the needles are fed from the hopper and straightened, the needle clamp gradually moves downwardly, pressing upon the remaining unstraightened needles in the hopper. When it is desired to refill the hopper the needle clamp is removed by lifting same out of the slots 228 in the side walls 227. When the hopper is again filled, the needle clamp is positioned upon the shank end of the needles as has been described.

Another form of needle clamp is shown in the drawings in Fig. 33. The positioning of this form of clamp in the hopper is illustrated in Figs. 1 and 2. The clamp is constructed from a length of spring wire, and includes a lower arm 243 designed to extend through the face between the bearing 4 and the back wall of the hopper and bear against the underside of the bracket 27 supporting the hopper (see Fig. 2).

The wire clamp is provided with an upper arm 244, the position of which when bearing against a plurality of needles deposited in the hopper is illustrated in full in Fig. 33 and the normal position of which is shown in dotted lines in said figure. Suitable turns 245 and 246 are provided in the wire clamp for retaining the necessary spring tension required in the arms 243 and 244.

By this construction it will be seen that the hopper can be filled with needles without removing the clamp, by depositing the needles upon the upper arm 244 while in place in the hopper. When the needles have been deposited the wire clamp is pulled out and sprung over the uppermost layers of needles in the hopper.

The operation of the machine follows:—

The needles to be straightened are deposited in the hopper 26 and the needle clamp positioned thereon as shown in the drawings. The needles are successively taken from the hopper 26 and delivered intermittently to the V groove 8 in the needle retaining block 6. The machine is started by engaging the clutch 214 through the manipulation of the clutch lever 219. Motion is now being transmitted to the main driving shaft 88 from where it is distributed to the other mechanisms of the machine.

When a needle has been deposited in the needle retaining block 6, the needle support 2 is moved inwardly by reason of the roller 14 carried by the lever 12 riding off of the nose 20 of the cam 15 onto the gradual rise surface 17 of the said cam. As the needle support 2 is moved inwardly the needle revolving means including the belt 9 is also reciprocated in timed relation therewith.

When the needle is deposited in the retaining block 6, the belt 9 is elevated therefrom by reason of the roller 162 riding upon the high portion of the cam surface 163, as shown in dotted lines in Fig. 8. When the needle revolving means is moved inwardly this roller 162 rides off of the high portion onto the lower portion of the cam surface 163, thereby permitting the endless belt 9 to engage the portion of the shank of the needle protruding above the V groove 8 and impart a rotary motion to said needle during the straightening operation.

In the position shown in Fig. 4 of the drawing the needle support carrying the needles to be straightened has been moved inwardly, and the hammer 55 is positioned ready to deliver a series of blows to the needle. This hammer 55 is brought into operative vibratory contact with the blade of the needle by reason of the arm 114 being moved away from the portion 115 formed upon the under side of the hammer lever 61. This operation is timed so as to become effective at the beginning of the straightening operation, and is accomplished by reason of the roller 121 carried by the lever 118 riding off of the high portion 123 of the cam 122 (see Fig. 9). When in this position the hammer 55 is ready to receive the series of blows imparted thereto by the blow wheel 76 keyed to the shaft 77 which is constantly rotated by reason of the meshing spiral gears 86 and 87, the latter of which is secured to the main shaft 88 of the machine.

The blow lever 68, and more especially the impact receiving nose 74 thereof is brought into positive contact with the teeth or projections 80 of the blow wheel by reason of the spring 126 as has been hereinbefore described. As the blow wheel is rotated in the direction of the arrow shown thereon in Fig. 4, the blow lever 68 will be rocked, thereby imparting vibratory motion intensified by the action of the spring 126, to the hammer 55, the nose of which latter is designed to strike the revolving needle and remove the crooks. The needle crook detecting device is designed to remain in contact with the blade of the needle as it is withdrawn by the needle support 2 during the straightening operation. The nose 106 of the arm 105 of the needle crook detecting device is designed to bear against the blade of the needle and impart all curvatures found therein to the ball member 100 carried by the arm 99. When the ball member 100 is moved upwardly between the coöperating anvils 90 and 93, heavier blows are delivered by the hammer to the needle blade, for removing the larger crooks or curves found therein. When the ball member 100 is moved downwardly between the coöperating anvils, lighter blows are imparted to the needle by the hammer.

During the straightening operation the needle support 2 is slowly retracted through the action of the roller 14 riding upon the gradual rise 17 provided on the cam 15. The dead rest portions 18 and 19 upon this cam 15 are designed to permit the hammer to vibrate slightly longer at points near the shank of the needle and eye or point thereof. The belt 9 is also retracted in timed relation with the needle support by the action of the roller 180 riding upon the rise 183 provided on the cam 181. When the straightening operation has been completed the needle support is quickly retracted by the action of the roller 14 riding upon the high portion 20 of the cam 15. A similar operation is produced by the needle revolving belt 9 when the roller 180 rides upon the high portion 186 of the cam 181. The reciprocatory retraction of the endless belt 9, however, stops short of the travel of the needle support, and serves to leave the needle ungripped in the needle retaining block 6 for its discharge into the needle pan, and the introduction of another needle to be straightened. The endless belt 9 is also elevated from the needle by reason of the roller 161 riding upon the high portion of the cam 163 as has been described.

The straightened needle is ejected when the needle support 2 has reached its outermost reciprocatory movement. This is caused by the partial oscillation of the needle support which serves to deliver the needle into the chute 189 as shown in Fig. 29 of the drawings. The straightened needle is delivered to the chute with the shank end thereof heading downwardly, thereby permitting its ready discharge into the usual needle receiving pan positioned at one side of the machine. (See Fig. 2.)

The oscillation of the needle support in ejecting the straightened needle is accomplished by means of the segment 193 operatively engaging the segmental gear 194 keyed to the end of the needle support 2. This operation occurs when the roller 204 carried by the lever 202 rides into the depression 207 formed in the cam 205 secured to the cam shaft 16. This movement is illustrated in Figs. 12 and 14. The arcuately disposed keyway 199 formed in the needle support 2 permits of this oscillation. The continued movement of the cam 205 which is designed to continuously rotate, will force the roller 204 from out of the depression 207 and return the needle support to its normal position for receiving another needle to be straightened.

When the needle support has been returned to its normal position another needle is delivered to the needle retaining block 6 by the feed drum 23, and the foregoing operation is repeated.

From the foregoing description and operation of the machine, it will be apparent that an efficient and highly sensitive needle straightening mechanism has been produced wherein a maximum output is obtained, and a commercially successful article produced.

What I claim is:—

1. In a needle straightening mechanism the combination of a needle support with a straightening device, means for reciprocating the needle support beneath the straightening device and during the straightening operation, and means for turning said support after the straightening operation for ejecting the straightened needle.

2. In a needle straightening mechanism the combination of a needle support with a straightening device, means for variably reciprocating the needle support when positioning a needle beneath the straightening device, and means for turning said support at one end of its reciprocatory path of travel for ejecting the straightened needle.

3. In a needle straightening mechanism the combination of a needle support with a straightening device, means for quickly reciprocating the needle support in one direction when positioning a needle beneath the straightening device and for slowly retracting the needle support in an opposite direction beneath the straightening device, and means for turning said support at one end of its reciprocatory path of travel for ejecting the straightened needle.

4. In a needle straightening mechanism the combination of a needle support with a straightening device, means for quickly reciprocating the needle support in one direction when positioning a needle beneath the straightening device, and for variably retracting the needle support in an opposite direction, and means for turning said support at one end of its reciprocatory path of travel for ejecting the straightened needle.

5. In a needle straightening mechanism the combination of a needle support with a straightening device, means for quickly reciprocating the needle support in one direction beneath the straightening device, for variably retracting the needle support in an opposite direction beneath the straightening device, for quickly continuing the retracting movement of the needle support after the straightening operation, and means for turning the needle support at the end of its path of travel in the opposite direction, for ejecting the straightened needle.

7. In a needle straightening mechanism the combination of a needle support with a straightening device, means including a pivoted lever and coöperating cam for reciprocating the needle support, and means including another lever and coöperating cam, for turning the needle support at one end of its reciprocatory path of travel for ejecting the straightened needle.

7. In a needle straightening mechanism the combination of a needle support with a straightening device, means including a spring actuated lever and coöperating cam for reciprocating the needle support and means including another spring actuated lever and coöperating cam for turning the needle support at one end of its reciprocatory path of travel for ejecting the straightened needle.

8. In a needle straightening mechanism the combination of a needle support with a straightening device, means for reciprocating the needle support and means for turning the needle support at one end of its reciprocatory path of travel, said means including a lever having a toothed segment, a segmental gear keyed to the needle support and meshing with the toothed segment, and a cam for controlling the operation of the aforesaid lever.

9. In a needle straightening mechanism the combination with a needle support of a straightening device, means for reciprocating the needle support beneath and beyond the straightening device, and means for oscillating the needle support at one end of its reciprocatory path of travel, said means including a gear coöperating with an arcuate key way formed in the needle support, and a relatively fixed key.

10. In a needle straightening mechanism the combination with a needle support of a straightening device, means for reciprocating the needle support beneath and beyond the straightening device, and means for oscillating the needle support at one end of its reciprocatory path of travel, said means comprising a gear, a relatively long key way in said needle support in which the said gear is keyed and held against rotation during the reciprocating movement, a movable segment adapted to mesh with the aforesaid gear, an arcuate key way formed in the needle support adjacent the relatively long key way, and a relatively fixed key operable in the aforesaid long and arcuate key ways.

11. In a needle straightening mechanism the combination with a reciprocating needle support, of means for feeding needles to the needle support at one end of the reciprocatory path of travel of the needle support, and means for turning the needle support and ejecting the straightened needle at the same end of the reciprocatory path of travel of the needle support, and a straightening device located near the opposite end of the reciprocatory path of travel of the needle support.

12. In a needle straightening mechanism the combination with a reciprocating needle support, of means for intermittently feeding unstraightened needles to the needle support at one end of its reciprocatory path of travel, means for oscillating the needle support at the same end of the reciprocatory path of travel of the needle support for ejecting the straightened needle, and a relatively fixed straightening device coöperatively associated with the needle support at the opposite end of the reciprocatory path of travel of the needle support.

13. In a needle straightening mechanism the combination with a needle support having a needle retaining seat therein, of means for supporting the needle in said seat, with a portion of the shank protruding, and means including an endless belt with pulleys supporting the same, said belt being adapted to bear upon the protruding portion of the shank of the needle and turn the same during the straightening operation.

14. In a needle straightening mechanism the combination with a needle support having a needle retaining seat therein, of means for supporting the needle in said seat with a portion of the shank protruding and means including an adjustably mounted frictionally engaging belt with pulleys supporting the same, said belt being adapted to bear upon the protruding portion of the shank of the needle and turn same during the straightening operation.

15. In a needle straightening mechanism the combination with a needle support having a needle retaining seat therein of means for supporting the needle in said seat with a portion of the shank protruding, and means including a yieldingly mounted endless belt with pulleys supporting the same, said belt being adapted to bear upon the protruding portion of the shank of the needle and revolve the same.

16. In a needle straightening machine, the combination with a needle support, of a straightening device, means for reciprocating the needle support beneath the straightening device and during the straightening operation, means for supporting the needle in said support with a portion of the shank protruding, means adapted to bear against the protruding portion of the shank of the needle for revolving the same during a portion of the reciprocatory path of travel of the needle support, and means for turning said support after the straightening operation for ejecting the straightened needle.

17. In a needle straightening mechanism, the combination with a needle support, of a straightening device, means for reciprocating the needle support beneath the straightening device and during the straightening operation, means for revolving the needle during a portion of the reciprocatory path of travel of the needle support past the straightening device, means for reciprocating said revolving means a predetermined distance in timed relation but short of the reciprocatory path of travel of the needle support, and means for turning said support after the straightening operation for ejecting the straightened needle.

18. In a needle straightening mechanism the combination with a needle support of a straightening device, means for reciprocating the needle support beneath the straightening device and during the straightening operation, means for revolving the needle during a portion of the reciprocatory path of travel of the needle support past the straightening device, and means including a lever and cam for reciprocating said revolving means in timed relation with the reciprocatory path of travel of the needle support, and means for turning said support after the straightening operation for ejecting the straightened needle.

19. In a needle straightening mechanism the combination with a needle support of a straightening device, means for reciprocating the needle support, and means for revolving the needle during a portion of the reciprocatory path of travel of the needle support beneath the straightening device, said means including a belt, pulleys for supporting said belt, and means for driving one of said pulleys.

20. In a needle straightening mechanism the combination with a needle support of a straightening device, means for reciprocating the needle support, and means for revolving the needle during a portion of the reciprocatory path of travel of the needle support beneath the straightening device, said means including a belt, a series of pulleys for supporting and driving said belt, and means for relatively moving one of said pulleys toward and away from the needle support.

21. In a needle straightening mechanism the combination with a needle support of a straightening device, means for reciprocating the needle support and means for revolving the needle during a portion of the reciprocatory path of travel of the needle support beneath the straightening device, said means including a belt, a series of pulleys for supporting and driving said belt, and a cam for relatively moving one of said pulleys toward and away from the needle support.

22. In a needle straightening mechanism the combination of a needle support with a straightening device, means for revolving the needle in said support during the straightening operation, means for reciprocating the needle support when positioned and straightening a needle, and means for oscillating the needle support when ejecting the needle.

23. In a needle straightening mechanism the combination with a straightening hammer, of means for vibrating said hammer, and means including a rolling member actuated by the crooks in the needle for determining the strength of the vibration of the hammer.

24. In a needle straightening mechanism the combination with a straightening hammer, of means for vibrating said hammer, and means for varying the strength of the vibration of the hammer, said means including a needle crook detecting device having an arm located entirely beneath the needle and designed to contact with the blade thereof and another arm provided with a revoluble member for limiting the vibrating movement of the hammer.

25. In a needle straightening mechanism the combination with a straightening hammer, of means for vibrating said hammer, and means for varying the strength of the vibration of the hammer, said means including a needle crook detecting device having a spring controlled arm located entirely beneath the needle and designed to contact with the blade thereof and another arm provided with a revoluble member actuated by the spring controlled arm for limiting the vibratory movement of the hammer.

26. In a needle straightening mechanism the combination with a straightening hammer, of means for vibrating said hammer, and means for varying the strength of the vibration of the hammer, said means including an arm located entirely beneath the needle and designed to contact with the blade thereof, another arm provided with a shiftable ball actuated by the first mentioned arm for detecting the vibratory movement of the hammer, and a series of coöperating anvils between which said ball operates.

In testimony whereof I affix my signature in the presence of two witnesses.

ALEXANDER ALTMAN.

Witnesses:
D. HILDRETH,
M. A. O'MEARA.